US009641790B2

(12) United States Patent
Stone et al.

(10) Patent No.: US 9,641,790 B2
(45) Date of Patent: May 2, 2017

(54) INTERACTIVE VIDEO PROGRAM PROVIDING LINEAR VIEWING EXPERIENCE

(75) Inventors: Brian Stone, London (GB); Jerry Johnson, London (GB); Joshua Whitney Samuels Atkins, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/531,295

(22) Filed: Jun. 22, 2012

(65) Prior Publication Data

US 2013/0094830 A1 Apr. 18, 2013

Related U.S. Application Data

(60) Provisional application No. 61/548,115, filed on Oct. 17, 2011.

(51) Int. Cl.
*H04N 7/16* (2011.01)
*H04N 5/775* (2006.01)
(Continued)

(52) U.S. Cl.
CPC ............... *H04N 5/775* (2013.01); *H04N 9/80* (2013.01); *H04N 21/8541* (2013.01)

(58) Field of Classification Search
CPC ........... H04N 21/4542; H04N 21/4335; H04N 21/44008; H04N 21/4402;
(Continued)

(56) References Cited

U.S. PATENT DOCUMENTS 4,305,131 A * 12/1981 Best .............................. 715/716
4,766,541 A * 8/1988 Bleich et al. .................... 463/31
(Continued)

OTHER PUBLICATIONS

Durand, et al., "A Metadata Model Supporting Scalable Interactive TV Services", Retrieved at <<http://www.dcs.gla.ac.uk/~mounia/Papers/savantPaperForMMM2005.pdf>>, Proceeding MMM '05 Proceedings of the 11th International Multimedia Modelling Conference, Jan. 12-14, 2005, pp. 386-391.
(Continued)

*Primary Examiner* — Nathan Flynn
*Assistant Examiner* — Cynthia Fogg
(74) *Attorney, Agent, or Firm* — Alleman Hall Creasman & Tuttle LLP

(57) ABSTRACT

Embodiments are disclosed that relate to creating and providing an interactive video program. One disclosed embodiment includes combining a first interactive video segment of a first type and a second interactive video segment of a second, different type than the first segment. The first interactive video segment includes a first video component, a second video component related to the first component, and metadata including information related to a possible user input that triggers the second component. The interactive video program includes an active viewing route that proceeds through the first and second interactive video segments, and includes playback of the second component. The active viewing route is triggered by receipt of an actual user input that corresponds to the possible user input. The interactive video program also includes a passive viewing route that proceeds through the first and second interactive video segments without playback of the second component.

24 Claims, 12 Drawing Sheets

(51) Int. Cl.
*H04N 21/8541* (2011.01)
*H04N 9/80* (2006.01)

(58) Field of Classification Search
CPC .......... H04N 21/25875; H04N 21/475; H04N 21/4751; H04N 21/4753; H04N 21/44218; H04N 1/00381; H04N 1/00395; H04N 21/2342; H04N 21/4758; H04N 21/8541
USPC ........................................................ 725/139
See application file for complete search history.

(56) References Cited

U.S. PATENT DOCUMENTS

| | | | | |
|---|---|---|---|---|
| 5,442,389 | A | * | 8/1995 | Blahut ............... H04N 7/17318 348/E7.071 |
| 5,510,828 | A | * | 4/1996 | Lutterbach et al. .......... 725/138 |
| 5,537,141 | A | * | 7/1996 | Harper et al. ................ 725/116 |
| 5,607,356 | A | * | 3/1997 | Schwartz ........................ 463/31 |
| 5,694,162 | A | * | 12/1997 | Freeny, Jr. .................... 725/116 |
| 5,695,401 | A | * | 12/1997 | Lowe et al. ...................... 463/4 |
| 5,861,881 | A | * | 1/1999 | Freeman et al. .............. 715/201 |
| 5,872,575 | A | * | 2/1999 | Segal ............................. 345/473 |
| 6,260,194 | B1 | * | 7/2001 | Shiels et al. .................. 725/134 |
| 6,409,599 | B1 | * | 6/2002 | Sprout et al. .................... 463/31 |
| 7,039,940 | B2 | * | 5/2006 | Weatherford ................. 725/112 |
| 7,046,911 | B2 | | 5/2006 | Zimmerman et al. |
| 7,373,336 | B2 | | 5/2008 | Jasinschi et al. |
| 7,634,787 | B1 | | 12/2009 | Gebhardt et al. |
| 8,498,722 | B2 | * | 7/2013 | Chung et al. ................... 700/91 |
| 8,898,713 | B1 | * | 11/2014 | Price ................. G06F 17/30412 725/21 |
| 2002/0053089 | A1 | * | 5/2002 | Massey ......................... 725/135 |
| 2002/0174436 | A1 | * | 11/2002 | Wu ........................ G06Q 30/02 725/87 |
| 2002/0188943 | A1 | * | 12/2002 | Freeman et al. ................ 725/38 |
| 2003/0046638 | A1 | * | 3/2003 | Thompson ........... G11B 27/105 709/231 |
| 2003/0090515 | A1 | * | 5/2003 | Chang ................. H04N 5/4401 715/745 |
| 2004/0194128 | A1 | * | 9/2004 | McIntyre et al. ............... 725/32 |
| 2005/0132420 | A1 | | 6/2005 | Howard et al. |
| 2005/0148279 | A1 | | 7/2005 | Maa |
| 2006/0156329 | A1 | * | 7/2006 | Treese ................... H04H 60/31 725/23 |
| 2007/0033634 | A1 | * | 2/2007 | Leurs ..................... H04N 7/163 725/143 |
| 2007/0038944 | A1 | * | 2/2007 | Carignano et al. ............... 715/757 |
| 2007/0055980 | A1 | * | 3/2007 | Megeid .................. H04N 7/162 725/28 |
| 2007/0099684 | A1 | * | 5/2007 | Butterworth ...................... 463/1 |
| 2007/0122786 | A1 | * | 5/2007 | Relan et al. .................... 434/308 |
| 2007/0211921 | A1 | * | 9/2007 | Popp et al. .................... 382/115 |
| 2009/0083780 | A1 | | 3/2009 | Beyabani |
| 2009/0300475 | A1 | * | 12/2009 | Fink et al. .................... 715/230 |
| 2009/0328103 | A1 | | 12/2009 | Morris |

OTHER PUBLICATIONS

"Learning Validation Using Gesture Recognition", U.S. Appl. No. 13/275,134, filed Oct. 17, 2011, pp. 35.

"Interactive Video", U.S. Appl. No. 13/275,124, filed Oct. 17, 2011, pp. 35.

* cited by examiner

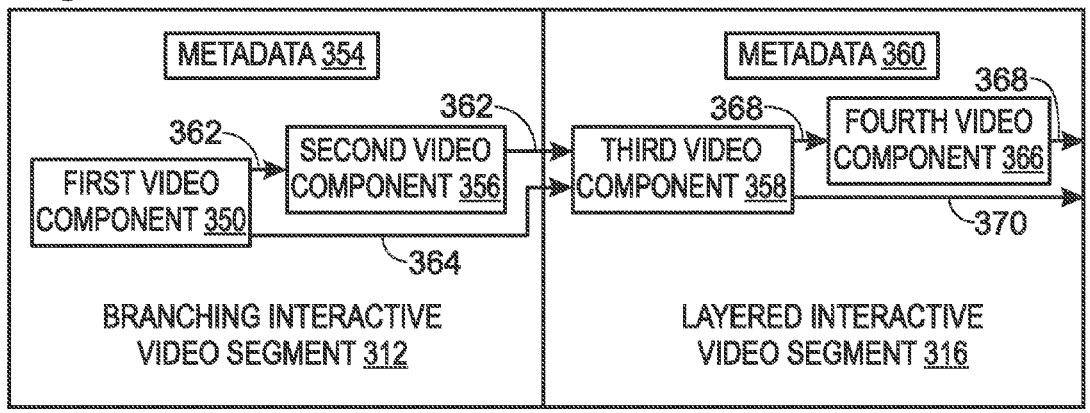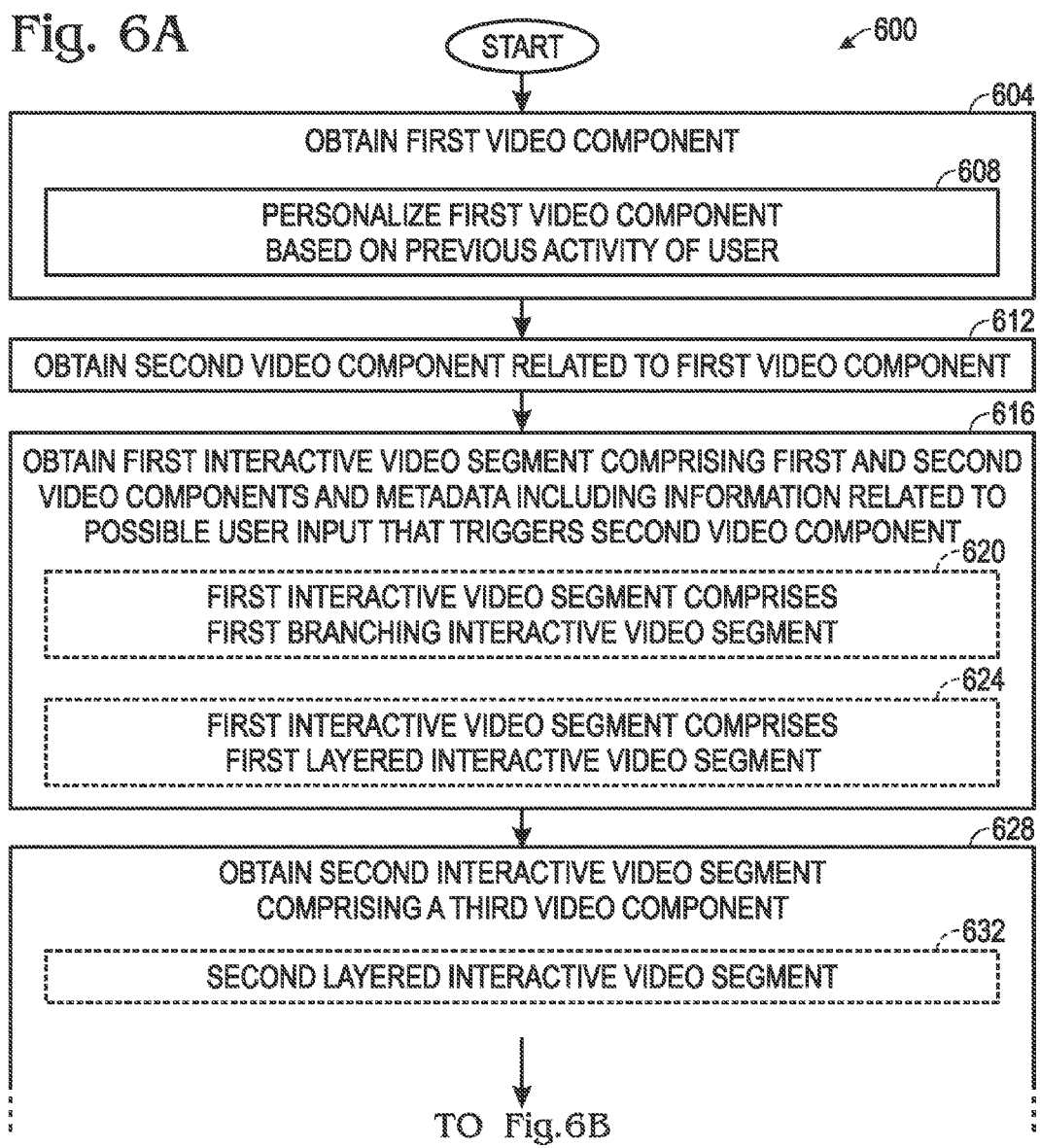

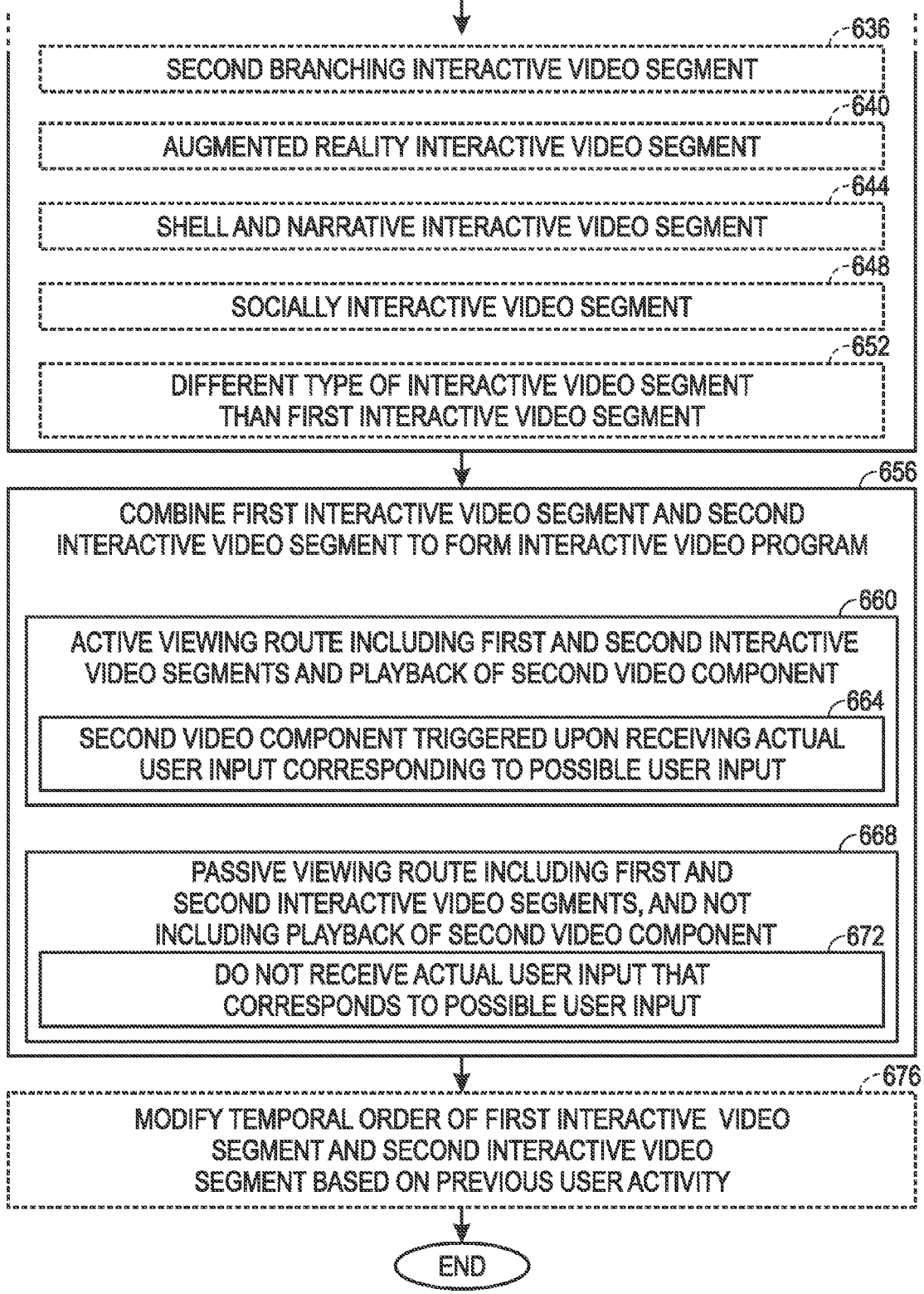

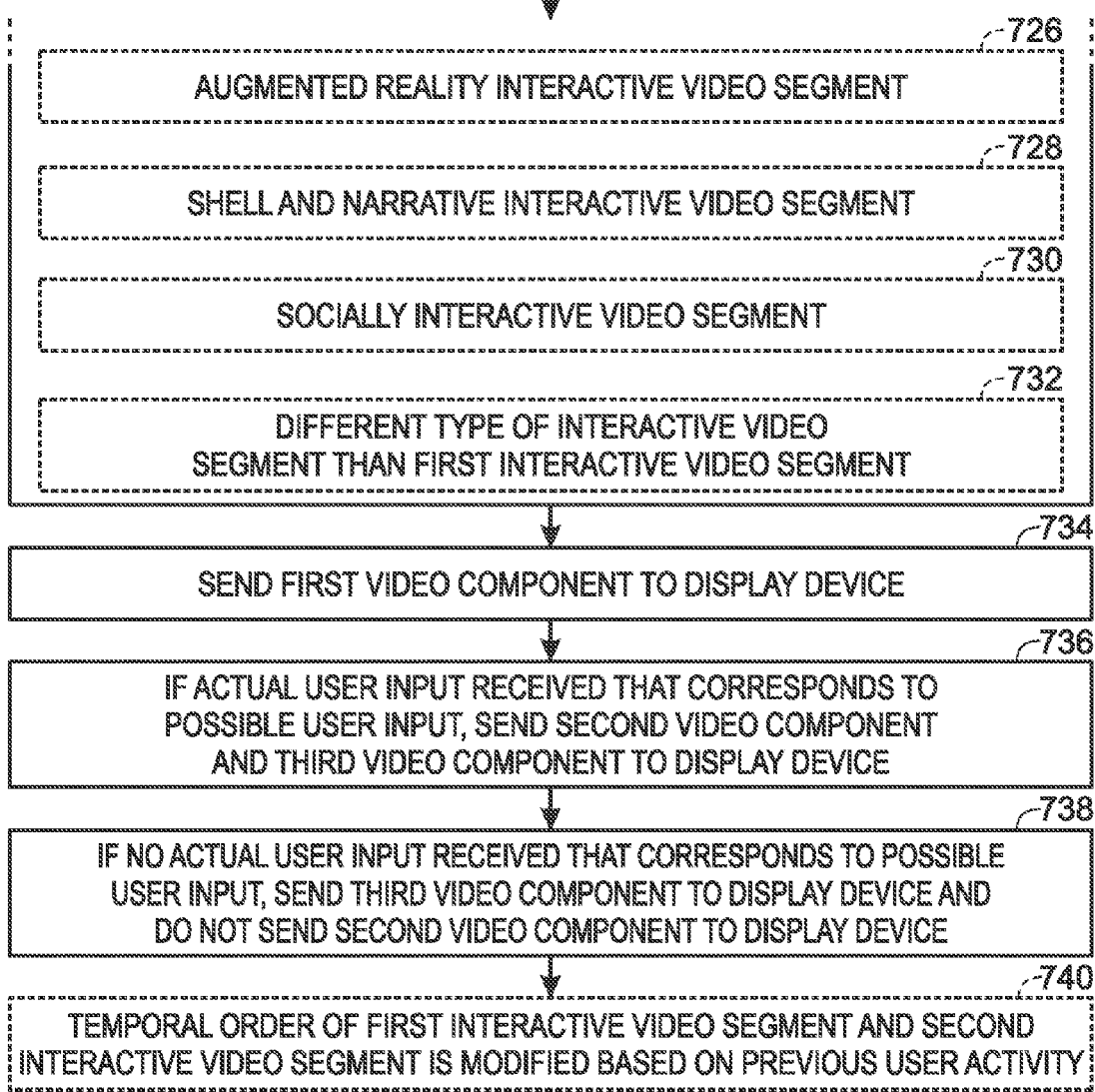

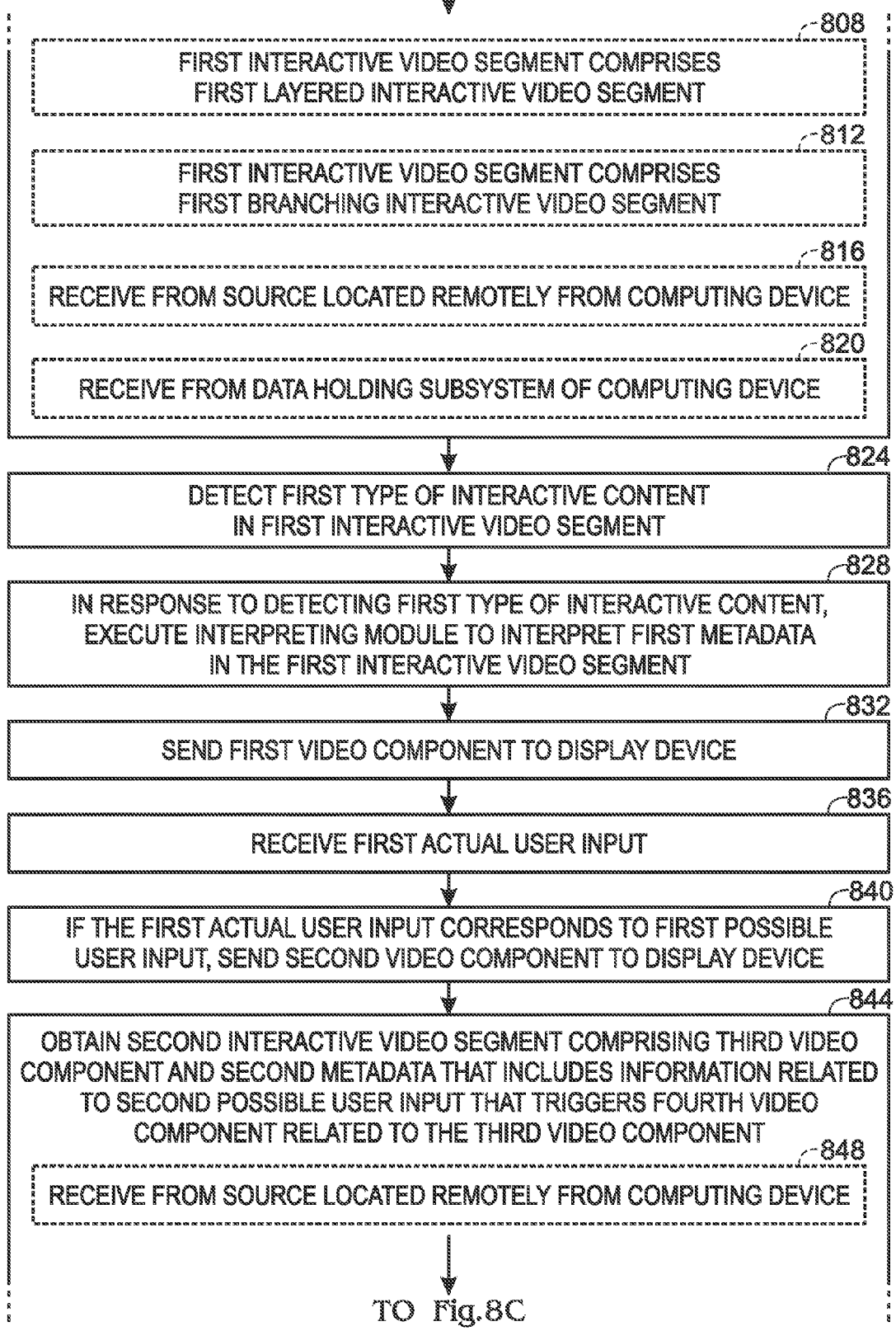

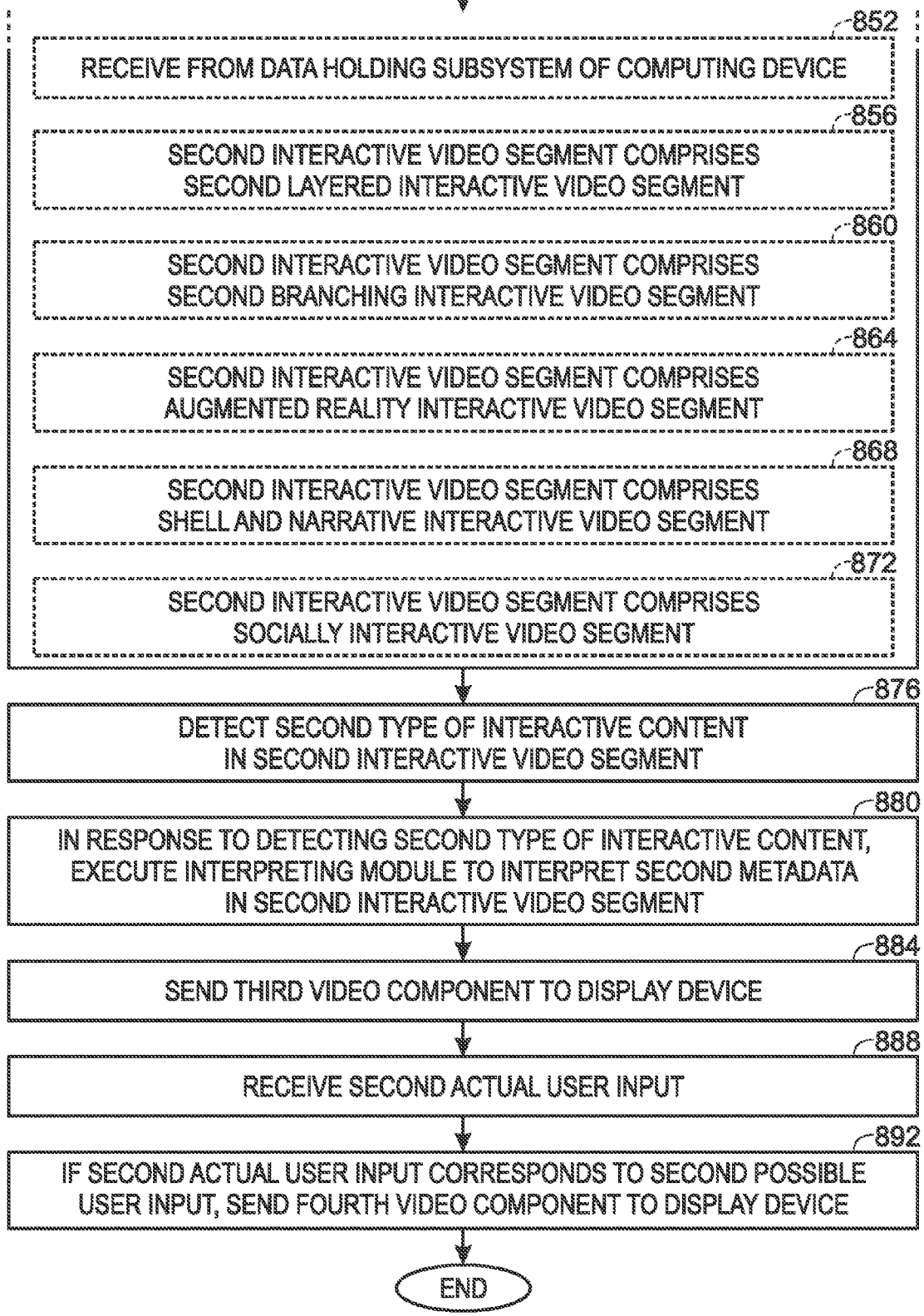

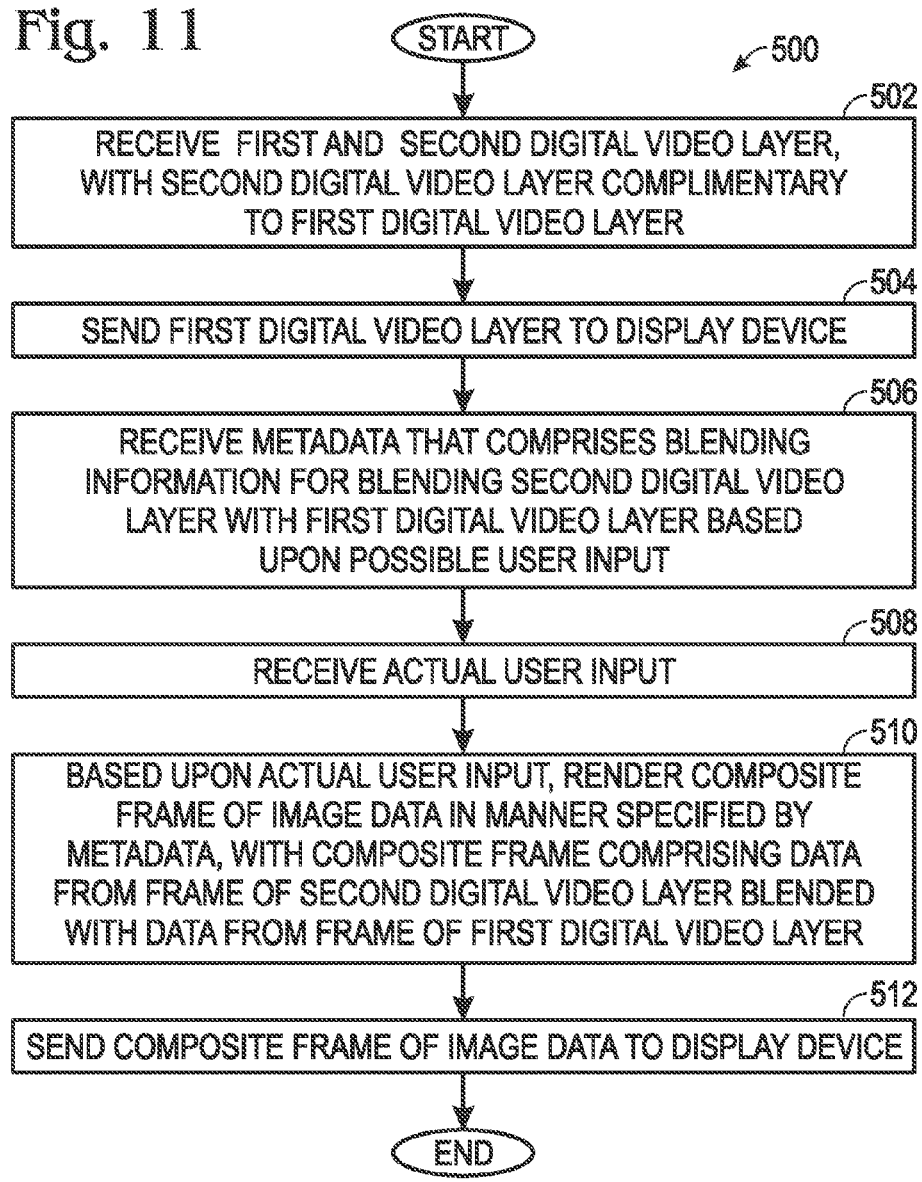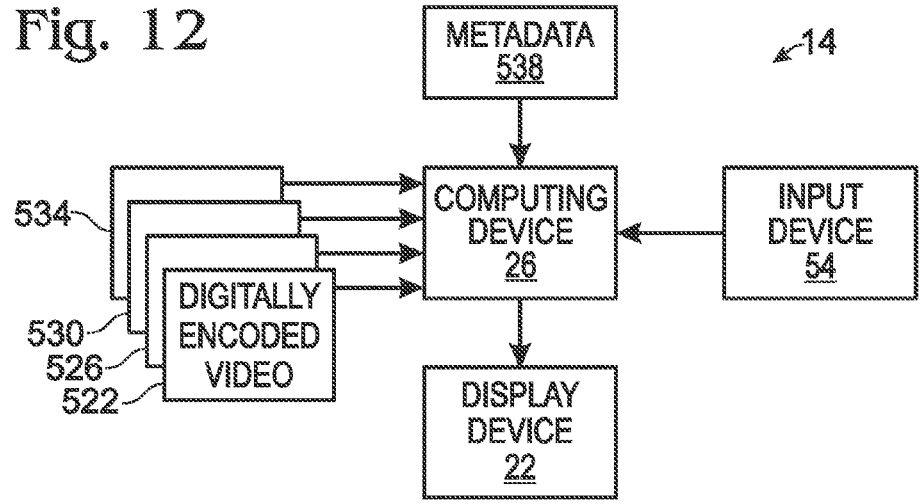

INTERACTIVE VIDEO PROGRAM PROVIDING LINEAR VIEWING EXPERIENCE

CROSS REFERENCE TO RELATED APPLICATIONS

This application claims priority to U.S. Provisional Patent Application Ser. No. 61/548,115 filed on Oct. 17, 2011 and entitled "INTERACTIVE VIDEO PROGRAM PROVIDING LINEAR VIEWING EXPERIENCE," the entirety of which is hereby incorporated by reference for all purposes.

BACKGROUND

Pre-recorded film and linear video, such as broadcast television programs, typically deliver a passive viewing experience that does not allow for user interaction. For example, a pre-recorded broadcast television program typically presents a static organization of content that flows in a fixed sequence. Viewers of such programs are unable to interact in a real-time manner with characters or other content. Additionally, when a viewer watches the same program a second time, the program presents the same organization of content flowing in the same sequence. Accordingly, content creators for pre-recorded film and linear video compose programs designed for passive viewing.

SUMMARY

Embodiments are disclosed that relate to creating and providing an interactive video program that provides a linear video viewing experience. For example, one disclosed embodiment comprises combining a first interactive video segment of a first type and a second interactive video segment of a second, different type than the first interactive video segment to form the interactive video program. The first interactive video segment includes a first video component and a second video component related to the first video component. The first interactive video segment also includes metadata that includes information related to a possible user input during the first video component configured to trigger the second video component. The metadata also includes information identifying that the first interactive video segment is of the first type. The second interactive video segment includes a third video component and metadata identifying that the second interactive video component is of the second type.

The interactive video program further comprises an active viewing route that proceeds through the first interactive video segment and the second interactive video segment and includes playback of the second video component. The active viewing route is configured to be triggered by receipt of an actual user input that corresponds to the possible user input. The interactive video program also includes a passive viewing route that proceeds through the first interactive video segment and the second interactive video segment without playback of the second video component. The passive viewing route is configured to be triggered where no user input corresponding to the possible user input is received.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a schematic illustration of two interactive video segments from the interactive video program of FIG. 3.

FIGS. 6A and 6B show a flow chart of an embodiment of a method of creating an interactive video program.

FIGS. 7A and 7B show a flow chart of an embodiment of a method of providing an interactive video program.

FIGS. 8A, 8B and 8C show a flow chart of another embodiment of a method of providing an interactive video program.

FIG. 11 shows a flow chart of an embodiment of a method of providing an interactive video viewing experience using layered interactive video.

FIG. 12 shows a schematic illustration of an embodiment of a computing system for providing layered interactive video.

DETAILED DESCRIPTION

Figure 1:
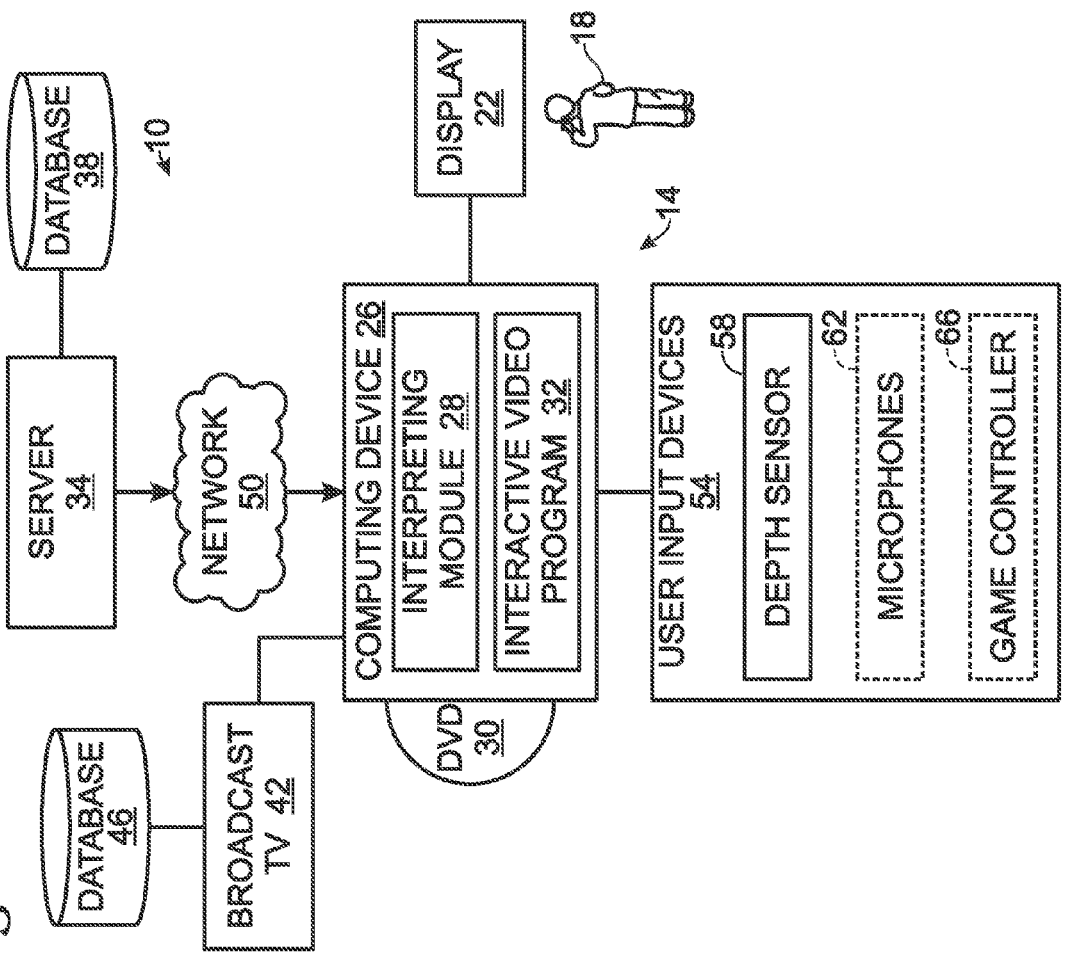
FIG. 1 shows an embodiment of a media delivery and presentation environment.

Embodiments are disclosed that relate to creating and providing an interactive video program. With reference to FIG. 1, an example embodiment of a media delivery and presentation environment 10 may include a computing system 14 that enables a user 18 to view and/or interact with various forms of media via display device 22. Such media may include, but is not limited to, broadcast television programs, linear video, video games, and other forms of media presentations. It will also be appreciated that the computing system 14 may be used to view and/or interact with one or more different media types or delivery mechanisms, such as video, audio, tactile feedback, etc., and/or control or manipulate various applications and/or operating systems.

The computing system 14 includes a computing device 26, such as a video game console, and a display device 22 that receives media content from the computing device 26. Other examples of suitable computing devices 26 include, but are not limited to, set-top boxes (e.g. cable television boxes, satellite television boxes), digital video recorders (DVRs), desktop computers, laptop computers, tablet computers, home entertainment computers, network computing devices, and any other device that may provide content to a display device 22 for display.

In one example, and as described in more detail below, one or more interactive video programs, such as interactive video program 32, metadata, other media content, and/or other data may be received by the computing device 26 from one or more remotely located content sources. In FIG. 1, example remote content sources are illustrated as a server 34 in communication with a content database 38, and broadcast television provider 42 in communication with a content database 46. It will be appreciated that computing device 26 may receive content from any suitable remote content sources including, but not limited to, on-demand video providers, cable television providers, direct-to-home satellite television providers, web sites configured to stream media content, etc.

Computing device 26 may receive content from the server 34 via computer network 50. The network 50 may take the form of a local area network (LAN), wide area network (WAN), wired network, wireless network, personal area network, or a combination thereof, and may include the Internet. Computing device 26 may also receive content directly from broadcast television provider 42 via a suitable digital broadcast signal such as, for example, a signal complying with Advanced Television Systems Committee (ATSC) standards, Digital Video Broadcast-Terrestrial (DVB-T) standards, etc. In other examples, content from broadcast television provider 42 may also be received via network 50.

FIG. 1 also shows an aspect of the computing device 26 in the form of removable computer-readable storage media 30, shown here in the form of a DVD. The removable computer-readable storage media 30 may be used to store and/or transfer data, including but not limited to the interactive video program 32, metadata, other media content and/or instructions executable to implement the methods and processes described herein. The removable computer-readable storage media 30 may also take the form of CDs, HD-DVDs, Blu-Ray Discs, EEPROMs, and/or floppy disks, among others. Additional details on the computing aspects of the computing device 26 are described in more detail below.

The computing system 14 may also include one or more user input devices 54 that may receive and/or sense user inputs from the user 18. As explained in more detail below, a user input device 54 may enable computing device 26 to provide an interactive video viewing experience to the user 18 through the interactive video program 32. Examples of user input devices include, but are not limited to, depth sensors 58 and/or other image sensors, microphones 62, game controllers 66, touch-based devices, and any other suitable user input device 54 that may provide user input to the computing device 26.

In some embodiments the user input device 54 may comprise a depth sensor 58 that is either separate from the computing device as shown in FIG. 1 or integrated into the computing device 26. The depth sensor 58 may be used to observe objects in the media delivery and presentation environment 10, such as user 18, by capturing image data and distance, or depth, data. Examples of depth sensors 58 may include, but are not limited to, time-of-flight cameras, structured light cameras, and stereo camera systems.

Figure 2:
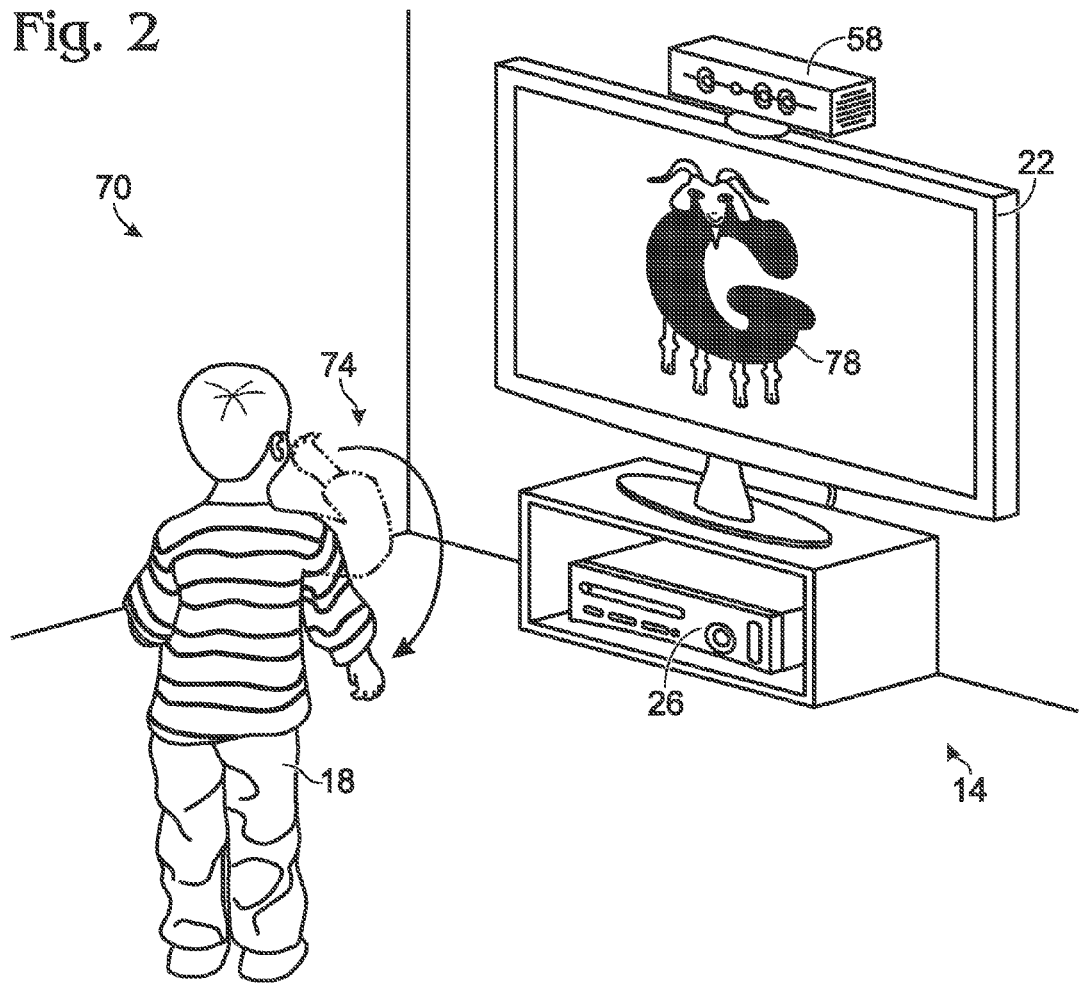
FIG. 2 shows an embodiment of a media presentation environment.

Data from the depth sensor 58 may be used to recognize an actual user input provided by the user 18. In some embodiments, the actual user input may comprise a gesture performed by the user. For example and with reference now to the media presentation environment 70 shown in FIG. 2, a gesture 74 may comprise a throwing motion that simulates throwing an imaginary ball toward the display device 22. It will be appreciated that data from the depth sensor 58 may be used to recognize many other gestures, motions or other movements made by the user 18 including, but not limited to, one or more limb motions, jumping motions, clapping motions, head or neck motions, finger and/or hand motions, etc. It will also be appreciated that other user input devices 54 may receive other forms of actual user input. For example, one or more microphones 62 may receive audio, such as vocal sounds, from the user 18.

Figure 3:
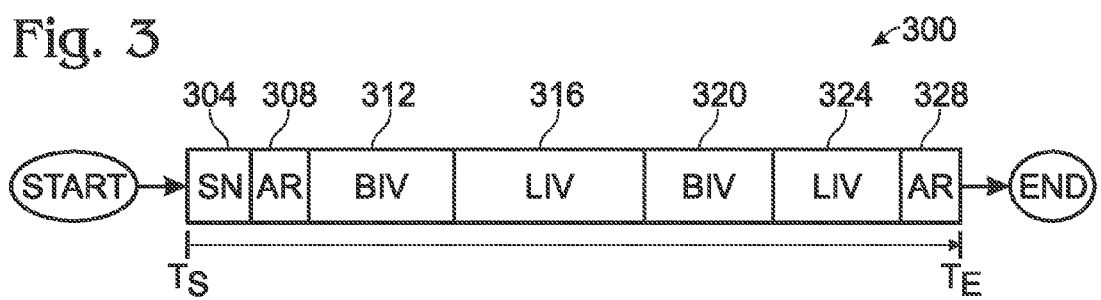
FIG. 3 shows a schematic illustration of an embodiment of an interactive video program.

With reference now to FIG. 3, an embodiment of an interactive video program 300 is provided. For convenience of description, the interactive video program 300 will be described with reference to the hardware and software components of the computing system 14 described above and shown in FIGS. 1 and 2. The interactive video program 300 may be created and/or sent to a display device 22 by the methods that are described in more detail below.

The interactive video program 300 may include multiple types of interactive video segments that are combined to create the interactive video program. As described in more detail below, the types of interactive video segments may include, but are not limited to, a shell and narrative video segment (SN), an augmented reality video segment (AR), a branching interactive video segment (BIV), a layered interactive video segment (LIV), and a socially interactive video segment. As explained in more detail below, one or more of the interactive video segments may invite the user 18 to provide user input in response to prompts, such as questions, requests, etc. provided via the segments. Based upon the actual user input or lack of input, an interruption-free transition to a modified or different video segment and/or video component may be provided to the display device 22. Additionally, each segment or component may be customized by the content creator to include different levels of user interactivity that are based on the amount, frequency and/or timing of a user's interaction with the segment or component. For example, a segment or component may be customized to provide additional audio and visual outputs based on the user's interactions. In this manner, segments of a show may be compartmentalized based upon technologies that drive each segment, and then may be stitched together such that the different segments are seamlessly joined into a linear video playback experience for the user. Further, the interactive capabilities of the interactive segments may allow users to enjoy different linear experiences.

As shown in FIG. 3, the interactive video program 300 may begin at a start time $T_S$ and flow in a serialized manner through the interactive video segments until the program ends at an end time $T_E$. As explained in more detail below, the interactive video segments will continue to be sent linearly to the display device 22, even if the user 18 does not interact and provides no user input.

At 304 the interactive video program 300 begins with a shell and narrative video segment 304. In one example, the shell and narrative video segment 304 may comprise an introduction to the interactive video program 300, including instructions and/or training regarding the interactive nature of the program. The shell and narrative video segment may also include interactive components that may provide additional content or experiences based on actual user input. The shell and narrative video segment 304 may tie together the narrative of the interactive video program 300. In some examples, the shell and narrative segment 304 may also provide mini-experiences outside of the particular narrative of the interactive video program 300. In other examples, the shell and narrative video segment 304 may support the inclusion of out-of-band experiences. The shell and narrative video segment may also be a video-based or runtime render-based segment.

When shell and narrative video segment 304 has been completed, the interactive video program 300 transitions to an augmented reality segment 308. In one example, the augmented reality segment 308 may comprise a viewing mode in which a representation of the media presentation environment 70, such as a room in which the user 18 is standing as viewed by the depth camera 58, is recreated on the display device 22. The user 18 may also be represented on the display device 22 and may, for example, walk back and forth within the room and interact with other elements in the room as depicted on the display device. In other examples, the augmented reality segment 308 may include one or more additional video segments and/or animations that are synchronized with the media presentation environment as depicted on the display device 22. Advantageously, in some examples the augmented reality segment 308 may bring a fantasy environment to life, and encourage a family to engage in the interactive video program 300 together. The augmented reality segment 308 may also encourage one or more users to engage in free play.

When the augmented reality segment 308 has been completed, the interactive video program 300 transitions to a branching interactive video segment 312. The branching interactive video segment 312 provides an interactive video viewing experience through pre-buffering transition portions of branch video segments that correspond to possible user inputs along a decision path. For example, a branching interactive video segment 312 may enable users, such as children, to interact with characters in a call-and-response type of interaction. In other examples, one or more branching interactive video segments may be used to provide learning and/or learning validation video segments. Additionally, new content may be created for branching interactive video segments. A more detailed description of branching interactive video is provided below.

When the branching interactive video segment 312 is completed, the interactive video program 300 transitions to a layered interactive video segment 316. The layered interactive video segment 316 provides an interactive video viewing experience through blending two or more digital video layers based on receiving an actual user input from the user 18. The layered interactive video segment 316 may leverage existing video, and may include one or more new layers of content. In one example, the layered interactive video segment 316 may reveal detailed content and experiences related to the interactive video program 300. In other examples, the layered interactive video segment 316 may provide additional information depth and inquiry immersion for existing content. Layered interactive video may also be scalable based on standard television production processes. A more detailed description of layered interactive video is provided below.

When the layered interactive video segment 316 is completed, the interactive video program 300 transitions to a second branched interactive video segment 320. When the second branched interactive video segment 320 is completed, the interactive video program 300 transitions to a second layered interactive video segment 324. When the second layered interactive video segment 324 is completed, the interactive video program 300 transitions to a second augmented reality video segment 328. When the second augmented reality video segment 328 is completed, the interactive video program 300 ends.

Figure 4:
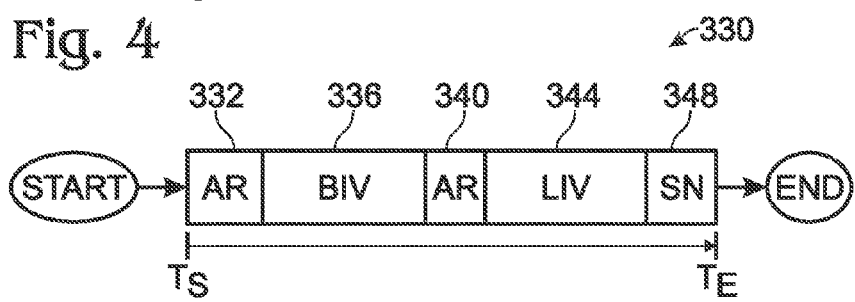
FIG. 4 shows a schematic illustration of another embodiment of an interactive video program.

With reference to FIG. 4, it will be appreciated that various interactive video segments may be organized and/or combined in any suitable manner to form an interactive video program. In some examples, the organization of an interactive video program may be personalized to the user 18 based on previous activity of the user. In a more specific example, based on previous user activity, it may be determined that the user 18 has a relatively short attention span. Accordingly, a personalized interactive video program 330 may be created for the user 18, with the program 330 having a shorter overall duration and fewer video segments as compared to interactive video program 300 shown in FIG. 3.

As shown in FIG. 4, the interactive video program 330 begins with a first augmented reality video segment 332. When the first augmented reality interactive video segment 332 is completed, the interactive video program 330 transitions to a branched interactive video segment 336. When the branched interactive video segment 336 is completed, the interactive video program 330 transitions to a second augmented reality video segment 340. When the second augmented reality video segment 340 is completed, the interactive video program 330 transitions to a layered interactive video segment 344. When the layered interactive video segment 344 is completed, the interactive video program transitions to a shell and narrative video segment 348. When the shell and narrative interactive video segment 348 is completed, the interactive video program 330 ends.

With reference now to FIG. 5, a schematic illustration of one example of the branching interactive video segment 312 and the layered interactive video segment 316 from the interactive video program 300 of FIG. 3 is provided. The branching interactive video segment 312 may include a first video component 350, metadata 354 and a second video component 356. The layered interactive video segment 316 may include a third video component 358, metadata 360 and a fourth video component 366.

Upon receiving the branching interactive video segment 312, the computing device 26 may examine the metadata 354, first video component 350 and/or second video component 356 to detect the type of interactive content contained in the branching interactive video segment. In response to detecting that the branching interactive video segment 312 contains branching interactive video content, an interpreting module 28 in the computing device 26 may be executed to interpret the metadata 354 in the first video component 350. The metadata 354 may include information related to one or more possible user inputs that will trigger playback of the second video component 356. In other words, if the computing device 26 receives an actual user input that corresponds with a possible input, then the interactive video program 300 may follow an active viewing route, indicated at 362 in FIG. 5, that transitions from the first video component 350 to the second video component 356.

In one example, the second video component 356 may be related to the first video component 350. In a more specific example, and as explained in more detail below, the interactive video program 300 may comprise an educational program that includes portions in which a character invites the user 18 to perform a target gesture, such as throwing an imaginary ball as shown in gesture 74 in FIG. 2. The first video component 350 may include the character asking the user 18 to throw the imaginary ball to the character. The second video component 356 may include a modified version of the first video component 350 that shows the character catching an imaginary ball thrown from the user 18. In this case, where the actual user input (throwing an imaginary ball) corresponds with the possible input (throwing an imaginary ball), the interactive video program 300 transitions from the first video component 350 to the second video component 356.

As described in more detail below, it will be appreciated that the second video component 356 may be related to the first video component 350 in various other ways including, but not limited to, visually, contextually, thematically, etc.

If the computing device 26 does not receive an actual user input that corresponds to the possible user input, then the interactive video program 300 may follow a passive viewing route, indicated at 364 in FIG. 5, that transitions from the first video component 350 to the third video component 358 in the layered interactive video segment 316. It will be appreciated that the passive viewing route does not include playback of the second video component 356. It will also be appreciated that situations in which the computing device 26 does not receive an actual user input that corresponds to the possible user input may include, for example, the user 18 providing no input (such as, for example, sitting quietly) or the user providing an actual user input that does not correspond to the possible user input.

A representation of the first video component 350 may be sent to the display device 22 for display to the user 18. If an actual user input is received that corresponds to a possible user input, then following the active viewing route 362 the computing device 26 may transition from the first video component 350 to the second video component 356. A representation of the second video component 356 may then be sent to and displayed on the display device 22.

In one example, upon completion of the second video component 356, the active viewing route 362 may transition from the second video component to the third video component 358 in the layered interactive video segment 316. As explained above for the branching interactive video segment 312, the computing device 26 may examine the metadata 360 and/or the third video component 358 to detect the type of interactive content contained in the layered interactive video segment 316. In response to detecting that the layered interactive video segment 316 contains layered interactive video content, the interpreting module 28 in the computing device 26 may be executed to interpret the metadata 360 and the third video component 358. A representation of the third video component 358 may then be sent to the display device 22.

In another example, and returning to the branching interactive video segment 312, if the user 18 provides no input then following the passive viewing route 364 the computing device 26 may proceed from the first video component 350 to the third video component 358 in the layered interactive video segment 316, bypassing the second video component 356. The third video component 358 may then be displayed on the display device 22.

Turning to the layered interactive video segment 316, and similar to the branching interactive video segment 312, metadata 360 may include information related to another possible user input that will trigger the fourth video component 366. If the computing device 26 receives an actual user input that corresponds with the other possible input, then the interactive video program 300 may follow another active viewing route 368 that transitions from the third video component 358 to the fourth video component 366. The fourth video component 366 may then be displayed on the display device 22. Upon completion of the fourth video component, the active viewing route 368 may transition from the fourth video component to another video component (not shown). If the computing device 26 does not receive an actual user input that corresponds to the other possible user input, then the interactive video program 300 may follow another passive viewing route 370 that transitions from the third video component 358 to another video component (not shown) that may be displayed on the display device 22. Additional descriptions of examples of branching interactive video segments and layered interactive video segments are provided below.

With reference now to FIG. 6A, an embodiment of a method 600 of creating an interactive video program that provides a linear video viewing experience is provided. The method 600 may be performed using the hardware and software components of the computing system 14 described above and shown in FIG. 1, or using any other suitable components. Additionally, FIGS. 3 and 5 described above illustrate an embodiment of an interactive video program 300. For convenience of description, the method 600 will be described herein with reference to the components of computing system 14 and the interactive video program 300 shown in FIGS. 3 and 5.

At 604 the method includes obtaining a first video component, such as first video component 350 shown in FIG. 5. It will be appreciated that the term "obtaining" as used herein includes receiving from a data holding subsystem of computing device 26 or from a content source located remotely from the computing device, forming on the computing device, and may include third party content, pre-existing content, such as a pre-existing television program or motion picture, etc. At 608 the method may include personalizing the first video component based on previous activity of the user 18. Provided that appropriate user permissions are received, such previous user activity may be gathered from user profile information stored on the computing device 26 or remote databases 38 and/or 46, from the user's previous interactions with the computing device 26 or other computing devices associated with the network 50, etc.

As described above regarding an interactive video program, in one example it may be determined from prior user activity that the user 18 has relatively short attention span. Accordingly, the first video component may be personalized for the user 18 by, for example, including more frequent invitations to interact with the program, providing a relatively shorter duration for the first video component, etc. It will be appreciated that the first video component may be personalized for the user 18 in various other manners based upon previous user activity.

At 612 the method includes obtaining a second video component, such as second video component 356, that is related to the first video component. At 616 the method includes obtaining a first interactive video segment that includes at least the first video component, the second video component, and metadata including information related to possible user input that triggers the second video component. As indicated at 620, the first interactive video segment may comprise a first branching interactive video segment, such as branching interactive video segment 312. In another example as indicated at 624, the first interactive video segment may comprise a first layered interactive video segment.

In one example as shown in FIG. 5, the branching interactive video segment 312 may also include the second video component 356. In other examples, the second video component may be located remotely from the branching interactive video segment 312. In these examples, the branching interactive video segment 312 may include a link or other connection information, such as in metadata 354, identifying the location of the second video component.

At 628 the method includes obtaining a second interactive video segment that comprises a third video component. As indicated at 632, and with reference to the example shown in FIG. 5, the second interactive video segment may comprise the layered interactive video segment 316. In other examples, and with reference now to FIG. 6B, the second interactive video segment may comprise one or more of a branching interactive video segment, indicated at 636, an augmented reality interactive video segment, indicated at 640, a shell and narrative interactive video segment, indicated at 644, or a socially interactive video segment, indicated at 648. In other examples, as indicated at 652, the second interactive video segment may comprise a different type of interactive video segment than first interactive video segment.

At 656 the method may include combining the first interactive video segment and the second interactive video segment to form the interactive video program. At 660 the interactive video program may include an active viewing route that includes proceeding through the first interactive video segment and the second interactive video segment, and further includes playback of the second video component via providing the second video component to the display device 22. At 664, and as discussed above with respect to FIG. 5, playback of the second video component may be triggered upon receiving an actual user input that corresponds to a possible user input.

At 668 the interactive video program may also include a passive viewing route that includes proceeding through the first interactive video segment and the second interactive video segment, but does not include playback of the second video segment. At 672, and as discussed above with respect to FIG. 5, the passive viewing route may be engaged when the computing device 26 does not receive an actual user input that corresponds to a possible user input.

In other examples, and as described above, at 676 the method may include modifying the temporal order of the first interactive video segment and second interactive video segment based on previous user activity. It will also be appreciated that one or more video components may be received from sources located remotely from the computing device 26, and assembled into one or more interactive video segments. One or more interactive video segments may also be received from sources located remotely from the computing device 26.

Figure 7A:
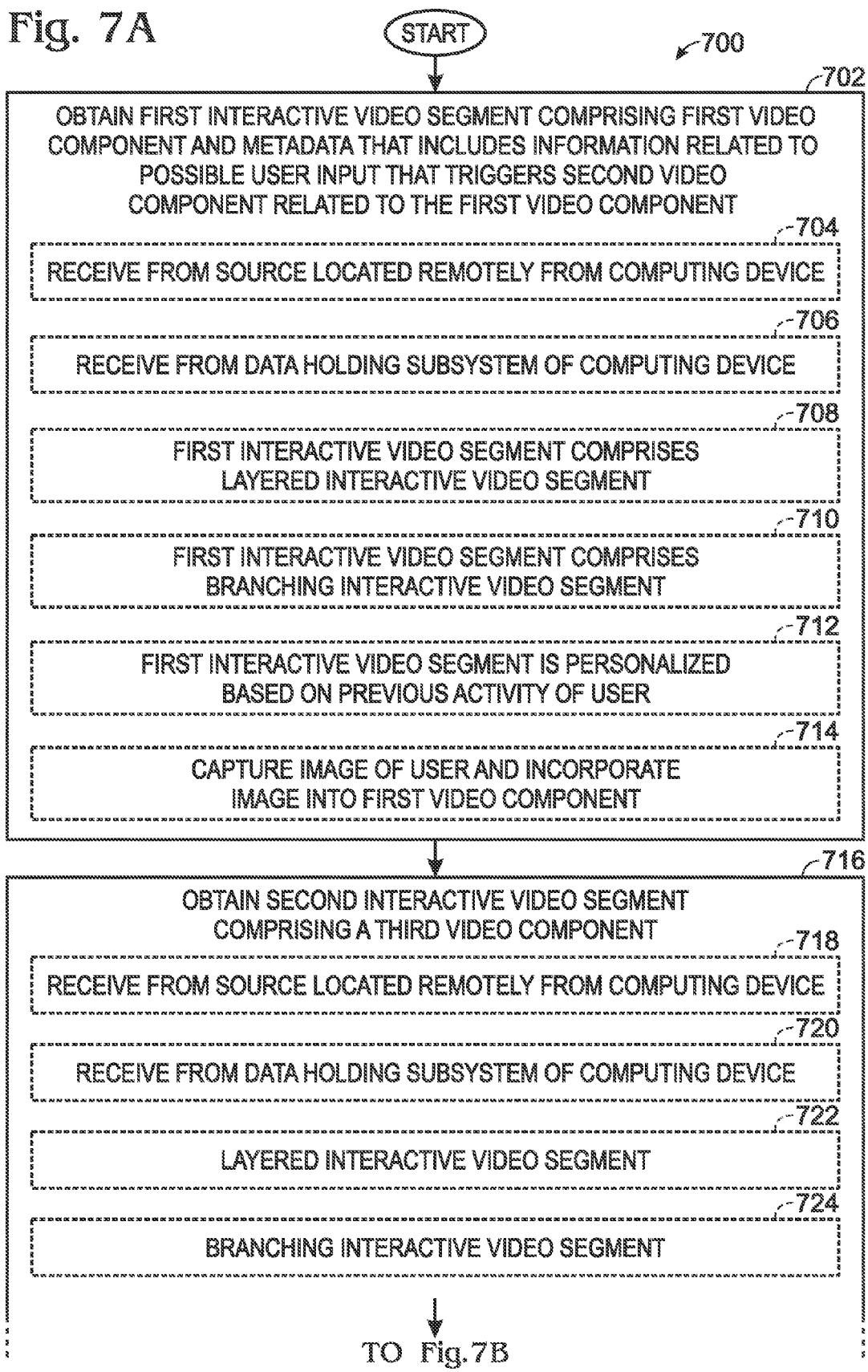

With reference now to FIG. 7A, an embodiment of a method 700 of providing an interactive video program that provides a linear video viewing experience is illustrated. The method 700 may be performed using the hardware and software components of the computing system 14 described above and shown in FIG. 1, or using any other suitable components. As noted, FIGS. 3 and 5 described above illustrate an embodiment of an interactive video program 300. For convenience of description, the method 700 will be described herein with reference to the components of computing system 14 and the interactive video program 300 shown in FIGS. 3 and 5.

At 702 the method includes obtaining a first interactive video segment comprising a first video component and metadata that includes information related to a possible user input that triggers a second video component related to the first video component. At 704, in one example the method may include receiving the first interactive video segment from one or more sources located remotely from computing device 24. At 706, in another example the method may include receiving the first interactive video segment from a data holding subsystem of computing device, as described in more detail below.

At 708, in one example the first interactive video segment may comprise a layered interactive video segment. At 710, in another example the first interactive video segment may comprise a branching interactive video segment. In other examples, and as described above, at 712 the first interactive video segment may be personalized based on previous activity of the user 18. In another example, at 714 the method may include capturing an image of the user 18 and incorporating the image into the first video component. For example, the computing device 26 may utilize an input device 54 to capture an image of a shirt that the user 18 is wearing. A representation of the user's shirt may be worn by a character in the first video component. In another example, a full-body image of the user 18 may be presented as a separate character in the first video component. It will also be appreciated that an image of the user 18 may be utilized by other types of interactive video segments, such as augmented reality interactive video segments, socially interactive video segments, and any other suitable types of interactive video segments.

At 716, the method may include obtaining a second interactive video segment comprising a third video component. As with the first interactive video segment, at 718 the method may include receiving the second interactive video segment from one or more sources located remotely from computing device 24. At 720, in another example the method may include receiving the second interactive video segment from a data holding subsystem of computing device 24.

As indicated at 722, the second interactive video segment may comprise a layered interactive video segment. In other examples, the second interactive video segment may comprise a branching interactive video segment, indicated at 724, an augmented reality interactive video segment, indicated at 726, a shell and narrative interactive video segment, indicated at 728, or a socially interactive video segment, indicated at 730. In other examples and with reference to FIG. 7B, the second interactive video segment may comprise a different type of interactive video segment than first interactive video segment, as indicated at 732.

At 734, the method may include sending a representation of the first video component to the display device 22. At 736, where an actual user input, such as a gesture performed by the user 18, is received and corresponds with a possible input, the method may include sending a representation of the second video component and the third video component to the display device 22. At 738, where no actual user input is received that corresponds to the possible user input then the method may include sending a representation of the third video component to the display device 22, but not sending a representation of the second video component to the display device.

In other examples, and as described above, at 740 the method may include modifying the temporal order of the first interactive video segment and the second interactive video segment based on previous user activity.

With reference now to FIG. 8A, another embodiment of a method 800 of providing an interactive video program that provides a linear video viewing experience is illustrated. The method 800 may be performed using the hardware and software components of the computing system 14 described above and shown in FIG. 1, or using any other suitable components. As noted, FIGS. 3 and 5 described above illustrate an embodiment of an interactive video program 300. For convenience of description, the method 800 will be described herein with reference to the components of computing system 14 and the interactive video program 300 shown in FIGS. 3 and 5.

At 804 the method includes obtaining a first interactive video segment comprising a first video component and first metadata that includes information related to a first possible user input that triggers a second video component related to the first video component. With reference now to FIG. 8B at 808, in one example the first interactive video segment may comprise a first layered interactive video segment. At 812, in another example the first interactive video segment may comprise a first branching interactive video segment. At 816, in one example the method may include receiving the first interactive video segment from one or more sources located remotely from computing device 24. At 820, in another example the method may include receiving the first interactive video segment from a data holding subsystem of computing device 24.

At 824, the method may include detecting a first type of interactive content in the first interactive video segment. For example and with reference to FIG. 5, the computing device 24 may examine the branching interactive video segment 312 and detect that it contains a branching interactive type of interactive content. At 828, in response to detecting the first type of interactive content, the method may include executing the interpreting module 28 to interpret the first metadata in the first interactive video segment.

At 832, the method may include sending a representation of the first video component to the display device 22. At 836, the method may include receiving a first actual user input, such as a gesture performed by the user 18. At 840, where the first actual user input corresponds to the possible input, the method may include sending a representation of the second video component to the display device 22.

At 844, the method may include obtaining a second interactive video segment comprising a third video component and second metadata that includes information related to a second possible user input that triggers a fourth video component related to the third video component. As with the first interactive video segment, at 848 the method may include receiving the second interactive video segment from one or more sources located remotely from computing device 24. With reference now to FIG. 8C at 852, in another example the method may include receiving the first interactive video segment from a data holding subsystem of computing device 24. At 856, the second interactive video segment may comprise a second layered interactive video segment. In other examples, the second interactive video segment may comprise a second branching interactive video segment, indicated at 860, an augmented reality interactive video segment, indicated at 864, a shell and narrative interactive video segment, indicated at 868, or a socially interactive video segment, indicated at 872.

At 876, the method may include detecting a second type of interactive content in the second interactive video segment. For example and with reference to FIG. 5, the computing device 24 may examine the layered interactive video segment 316 and detect that it contains a layered interactive type of interactive content. At 880, in response to detecting the second type of interactive content, the method may include executing the interpreting module 28 to interpret the second metadata in the second interactive video segment.

At 884, the method may include sending a representation of the third video component to the display device 22. At 888, the method may include receiving a second actual user input, such as another gesture performed by the user 18 or other type of input. At 892, where the second actual user input corresponds to the second possible user input, the method may include sending a representation of the fourth video component to the display device 22.

Figure 9:
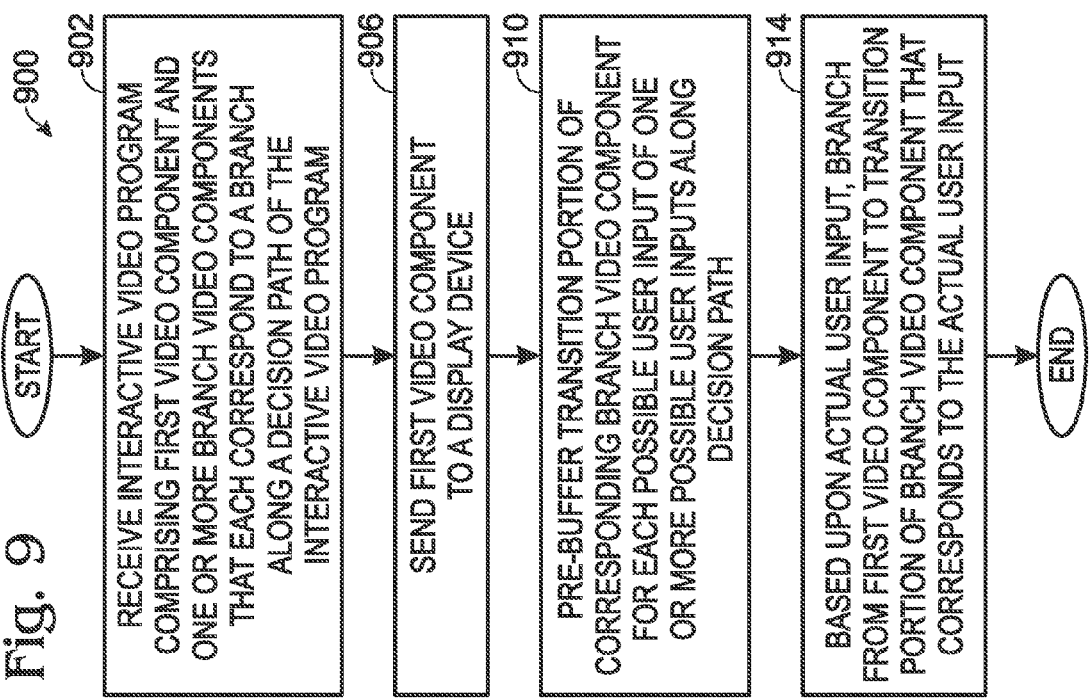
FIG. 9 shows a flow chart of an embodiment of a method of providing an interactive video viewing experience using branching interactive video.
Figure 10A:
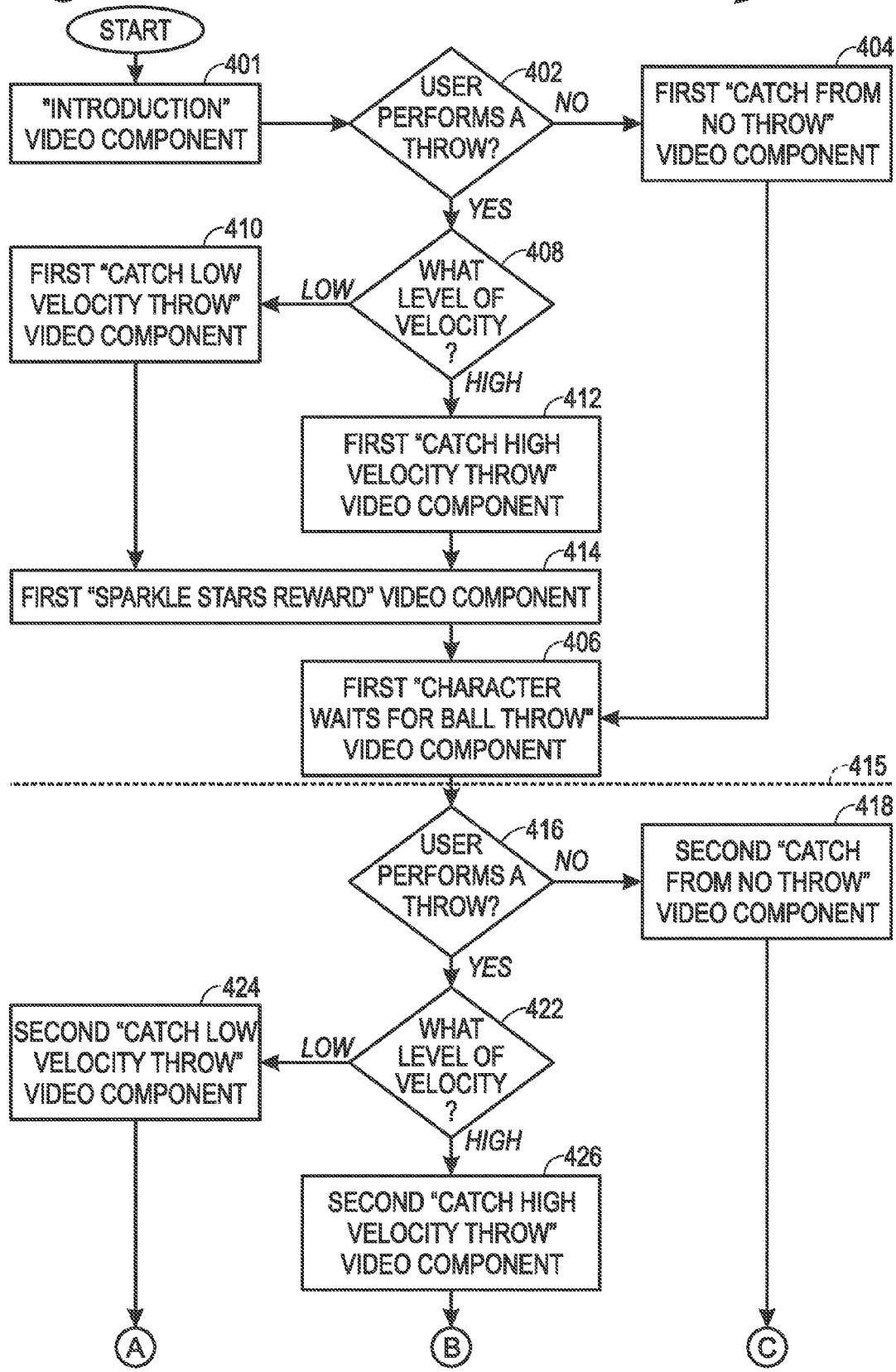
FIGS. 10A and 10B show an embodiment of a decision path that is representative of a method of providing an interactive video viewing experience using branching interactive video.
Figure 10B:
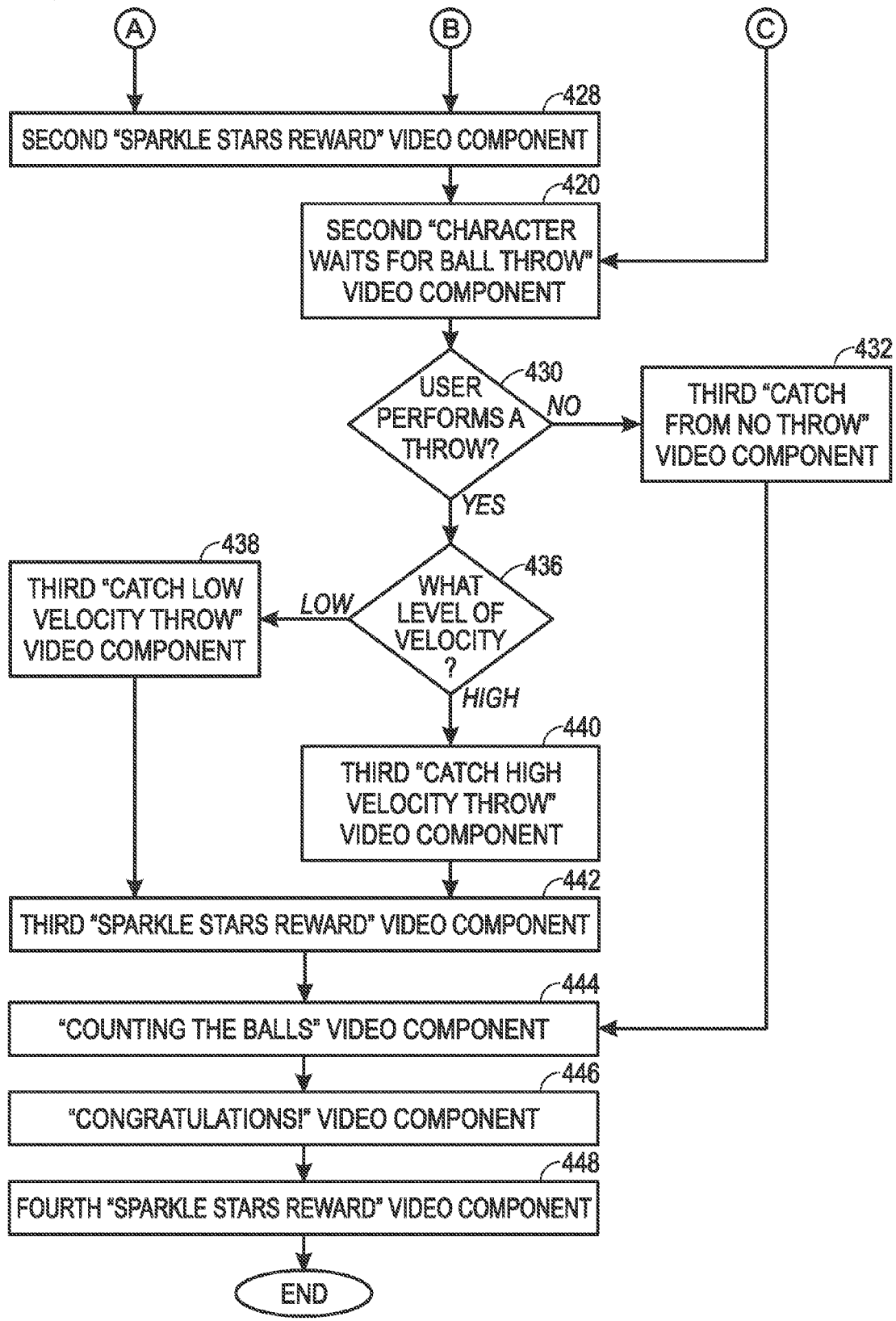

Turning now to FIG. 9, a more detailed description of a branching interactive video segment is provided. More specifically, FIG. 9 provides an example embodiment of a method 900 of providing an interactive video viewing experience through one or more branching interactive video segments. The method 900 may be performed using the hardware and software components of the computing system 14 described above and shown in FIGS. 1 and 2, or using any other suitable components. Additionally, FIGS. 10A and 10B illustrate an embodiment of a decision path 400 as a more detailed example of a method of providing an interactive video viewing experience through one or more branching interactive video segments. As described in more detail below, the decision path 400 includes multiple branches leading to one or more branch video components along the decision path. For convenience of description, the method 900 will be described herein with reference to the components of computing system 14 and the decision path 400 shown in FIGS. 10A and 10B.

As described in more detail below, in some examples the decision path 400 may relate to an interactive video program 32 in which a user 18 is invited to provide a target input in the form of a target gesture. As described above, the target gesture may comprise throwing an imaginary ball to a character displayed on the display device 22. In another example, the target gesture may comprise the user jumping in place. It will be appreciated that the target gesture may comprise any gesture, motion or other movement made by the user 18 that may be captured by one or more of the user input devices 54 including, but not limited to, one or more limb motions, jumping motions, clapping motions, head or neck motions, finger and/or hand motions, etc.

In a more specific example, the user 18 may be asked to practice the target gesture, and data from the user input device 54 may be used to determine whether the user performs the target gesture. If the user 18 does not perform the target gesture, an additional tutorial video explaining and/or demonstrating the target gesture may be provided to the display device 22.

In some examples, the interactive video program 32 may also include a learning element designed to help user 18 learn numbers and/or letters of an alphabet. In one example, and as described in more detail below with reference to FIGS. 10A and 10B, a Number of the Day may be presented to the user 18. The interactive video program 32 counts each time the user 18 responds to a request from the character on the display device 22 by throwing an imaginary ball toward the display. With each throw, the character may congratulate the user 18, and the current number of throws may appear on the display device 22. When the number of user throws equals the Number of the Day, the character may give the user 18 additional congratulations and the Number of the Day may be displayed with visual highlights on the display device 22.

Turning now to FIG. 9, at 902 the method 900 includes receiving an interactive video program 32 that comprises a first video component and one or more branch video components, with each branch video component corresponding to a branch along a decision path of the interactive video program. As noted above, the interactive video program 32 may be received from DVD 30, broadcast television provider 42, server 34, or any other suitable content provider.

Examples of decision path branches and corresponding branch video components along decision path 400 are provided in more detail below with respect to FIGS. 10A and 10B.

With reference to 401 in FIG. 10A, a first branch video component may comprise an introduction to the interactive video program that explains the Number of the Day and the target gesture to the user 18. In one example, the Number of the Day may be 3 and the target gesture may comprise throwing the imaginary ball to the character on the display device 22 as described above. The introduction may include a portion in which the character asks the user 18 to throw the imaginary ball to the character. With reference to 906 in FIG. 9, the method 900 includes sending a representation of a first video component, such as the introduction video component from 401 in FIG. 10A, to the display device 22 for presentation to the user 18.

At 910 in FIG. 9, the method 900 includes pre-buffering a transition portion of a corresponding branch video component for each possible user input of a set of one or more possible user inputs along the decision path 400. In one example, by pre-buffering a transition portion of one or more branch video components along the decision path 400, the method 900 may enable interruption-free transitions between video components. In this manner, user 18 may experience the interactive video program 32 as a continuous video viewing experience that is akin to viewing standard broadcast television, video or motion picture film, except that the user interacts in a real-time manner with one or more characters or other elements in the program.

A transition portion of a branch video component may comprise a portion of the video component that, when pre-buffered, enables an interruption-free transition between the currently-displayed video component and the branch video component. In some examples, the transition portion of a branch video component may comprise 1500 milliseconds of video, or any suitable amount of the video component. In other examples, the size of a transition portion of a branch video may be determined based upon a number of the possible user inputs along the decision path 400.

As explained in more detail below, the decision path 400 may include multiple branches at which user input may be received. At one or more of these branches, the user 18 may be asked to perform a target gesture, in this example a throwing motion. The user 18 may respond to the request in multiple ways—by performing the target gesture, by performing a different gesture, motion, or movement that is not the target gesture, by performing no action (inaction), etc. At 914 of FIG. 9, and at each branch where possible user input may be received, the interactive video program 32 may branch to a transition portion of a branch video component that corresponds to the actual user input that is received. If the actual user input matches a target input at a branch where possible user input may be received, then the interactive video program 32 may branch to a transition portion of a target input branch video component that corresponds to the target input.

In one example, the method 900 may pre-buffer a transition portion of only those branch video components corresponding to possible user inputs that occur within a predetermined node depth of the decision path 400. In this manner, the method 900 may conserve resources in the computing device 26 by pre-buffering only a minimum number of branch video components to allow for interruption-free transitions. In one example and with reference to FIG. 10A, where a current position along decision path 400 is at branch 402, the node depth may include branch video components 404, 410, 412, 414 and 406 that are each positioned above node depth line 415. Alternatively expressed, the node depth may be set to include the 5 branch video components that are immediately downstream from branch 402 (e.g., branch video components 404, 410, 412, 414 and 406). It will be appreciated that other node depths containing more or less branch video components may be provided. In some examples, the branch video components that are pre-buffered may be continuously updated to include additional branch video components as a current position of the decision path 400 moves to a new branch.

Turning to FIG. 10A and as noted above, based upon an actual user input that corresponds to a selected possible input from the set of one or more possible user inputs, the decision path 400 may branch from a current video component to a transition portion of a branch video component that corresponds to the actual user input. More specifically, at branch 402 of the decision path 400, the decision path includes determining whether the user 18 performs a throw as requested by a requesting character presented on the display device 22. If the user 18 does not perform a throw, and instead performs another gesture or movement that is not a throwing motion, or performs no gesture or movement, then at 404 the decision path 400 branches to a first "Catch From No Throw" video component. In one example, the first "Catch From No Throw" video component may comprise displaying another character on the display device 22 who says to the requesting character, "I'll play with you," and throws a ball to the requesting character. The requesting character may catch the ball and exclaim, "Catch number 1!" and the number 1 may be displayed on the display device 22.

At 406 the decision path 400 may then branch to a transition portion of a first "Character Waits For Ball Throw" video component. In one example the "Character Waits For Ball Throw" video component may comprise the requesting character holding a basket out as if to catch a ball while saying, "Throw me the ball and I'll catch it in my favorite basket!"

Returning to 402, if the user 18 performs a throwing motion then the decision path branches to 408 and determines what level of velocity to assign to the user's throwing motion. In one example, data from the depth sensor 58 may be used to determine a velocity of the user's arm during the throwing motion. If the velocity is less than or equal to a threshold velocity, then the decision path may characterize the velocity as "low velocity." If the velocity is greater than the threshold velocity, then it may be characterized as "high velocity."

It will be appreciated that other gesture variations, aspects, characteristics and/or qualities of the user's movement or other user action may be used to assign a relative status to the user action. Such variations, aspects, characteristics and/or qualities of the user's gesture, movement or other user action may include, but are not limited to, a type of gesture (for example, an overhand, sidearm, or underhand throwing motion), a magnitude of a movement or action (for example, a height of a jumping motion or a decibel level of a user's vocal response), a response time of a user's response to a request, etc. Based on a relative status, or gesture variation, assigned to the user's actual gesture, the interactive video program may branch to a gesture variation branch video component that corresponds to the gesture variation assigned to the user's actual gesture.

Returning to 408, and based on the level of velocity of the user's throwing motion, the decision path may branch to a transition portion of either branch video component 410 or branch video component 412. If the user's throwing motion is determined to be a low velocity throw, then at 410 the decision path 400 branches to a transition portion of a first "Catch Low Velocity Throw" video component. In one example, a low velocity throw may comprise a velocity of the user's throwing motion being less than a predetermined velocity. The first "Catch Low Velocity Throw" video component may comprise the requesting character holding out a basket, a ball flying into the scene, and the character catching the ball in the basket. The character may then say, "I caught the ball! Catch number 1!" and a number 1 may be displayed on the display device. At 414 the decision path may then branch to a transition portion of a first "Sparkle Stars Reward" video component that adds sparkles around the number 1 displayed on the display device. From 414 the decision path may branch to 406 and the first "Character Waits For Ball Throw" video component.

Returning to 408, if the user's throwing motion is determined to be a high velocity throw, then at 412 the decision path 400 branches to a transition portion of a first "Catch High Velocity Throw" video component. In one example, a high velocity throw may comprise a velocity of the user's throwing motion being greater than or equal to a predetermined velocity. The first "Catch High Velocity Throw" video component may comprise the requesting character holding out a basket, a ball flying into the scene, and the character catching the ball in the basket. The character may then say, "Did you see me catch the ball?! Catch number 1!" and a number 1 may be displayed on the display device. At 414 the decision path may then branch to a transition portion of the first "Sparkle Stars Reward" video component that adds sparkles around the number 1 displayed on the display device. From 414 the decision path may branch to 406 and the first "Character Waits For Ball Throw" video component.

At 406 the decision path may branch to 416 to determine whether the user 18 performs another throw as requested by the requesting character. If the user 18 does not perform a throw, then at 418 the decision path 400 branches to a second "Catch From No Throw" video component. In one example, the second "Catch From No Throw" video component may comprise displaying another character on the display device 22 who tells the requesting character, "Here's another one," and throws a ball to the requesting character. The requesting character may catch the ball and exclaim, "Easy one! Catch number 2!" and a number 2 may be displayed on the display device 22. With reference now to FIG. 10B, the decision path 400 may then branch to a transition portion of a second "Character Waits For Ball Throw" video component 420. In one example, the second "Character Waits For Ball Throw" video component may comprise the requesting character holding a basket out as if to catch a ball while saying, "I'm ready for another one! Throw again!"

Returning to 416, if the user 18 performs a throwing motion then the decision path 400 branches to 422 and determines what level of velocity to assign to the user's throwing motion. Based on the level of velocity of the user's throwing motion, the decision path may branch to a transition portion of either branch video component 424 or branch video component 426.

If the user's throwing motion is determined to be a low velocity throw, then at 424 the decision path 400 branches to a transition portion of a second "Catch Low Velocity Throw" video component. In one example, the second "Catch Low Velocity Throw" video component may comprise the requesting character holding out a basket, a ball flying into the scene, and the character catching the ball in the basket. The character may then say, "That was an easy one! Catch number 2!" and a number 2 may be displayed on the display device 22. With reference to FIG. 10B, the decision path 400 may then branch to a transition portion of a second "Sparkle Stars Reward" video component 428 that adds sparkles around the number 2 displayed on the display device 22. From 428 the decision path may branch to 420 and the second "Character Waits For Ball Throw" video component.

Returning to 422, if the user's throwing motion is determined to be a high velocity throw, then at 426 the decision path 400 branches to a transition portion of a second "Catch High Velocity Throw" video component. In one example, the second "Catch High Velocity Throw" video component may comprise the requesting character holding out a basket, a ball flying into the scene, and the character catching the ball in the basket. The character may then say, "That was a super hard throw! Catch number 2!" and a number 2 may be displayed on the display device 22. With reference to FIG. 10B, at 428 the decision path may then branch to a transition portion of the second "Sparkle Stars Reward" video component that adds sparkles around the number 2 displayed on the display device 22. From 428 the decision path may branch to 420 and the second "Character Waits For Ball Throw" video component.

At 420 the decision path 400 may branch to 430 to determine whether the user 18 performs another throw as requested by the requesting character. If the user 18 does not perform a throw, then at 432 the decision path 400 branches to a third "Catch From No Throw" video component. In one example, the third "Catch From No Throw" video component may comprise displaying another character on the display device 22 who tells the requesting character, "Here you go," and throws a ball to the requesting character. The requesting character may catch the ball and exclaim, "I'm the best! Catch number 3!" and the number 3 may be displayed on the display device 22.

The decision path 400 may then branch to 444 and a transition portion of a "Counting The Balls" video component in which the requesting character may hold the basket out to show the user 18 that there are 3 balls in the basket. The requesting character may say, "Let's see how many balls I caught!" The character may point to a first ball and say, "One!", then to a second ball and say, "Two!", and to the third ball and say "Three!" After the character says each number, the corresponding numeral may be displayed with sparkles on the display device 22.

The decision path 400 may then branch to 446 and a transition portion of a "Congratulations" video component that may include the requesting character and/or the other character congratulating the user 18 and telling the user, "Three! That's brilliant! Great job!" The decision path 400 may then branch to a transition portion of a fourth "Sparkle Stars Reward" video component 448 that presents a sparkling fireworks display to the user 18 on the display device 22. The decision path 400 may then end.

Returning to 430, if the user 18 performs a throwing motion then the decision path branches to 436 and determines what level of velocity to assign to the user's throwing motion. Based on the level of velocity of the user's throwing motion, the decision path may branch to a transition portion of either branch video component 438 or branch video component 440.

If the user's throwing motion is determined to be a low velocity throw, then at 438 the decision path 400 branches to a transition portion of a third "Catch Low Velocity Throw" video component. In one example, the third "Catch Low Velocity Throw" video component may comprise the requesting character holding out a basket, a ball flying into the scene, and the character catching the ball in the basket. The character may then say, "I wonder if I can eat these! Catch number 3!" and a number 3 may be displayed on the display device 22. The decision path 400 may then branch to a transition portion of a third "Sparkle Stars Reward" video component 442 that adds sparkles around the number 3 displayed on the display device 22. From 442 the decision path may branch to 444 and the "Counting the Balls" video component, followed by the "Congratulations" video component at 446 and the fourth "Sparkle Stars Reward" video component at 448. The decision path 400 may then end.

Returning to 436, if the user's throwing motion is determined to be a high velocity throw, then at 440 the decision path 400 branches to a transition portion of a third "Catch High Velocity Throw" video component. In one example, the third "Catch High Velocity Throw" video component may comprise the requesting character holding out a basket, a ball flying into the scene, and the character catching the ball in the basket. The character may then say, "I'm the ball catching king of the world! Catch number 3!" and a number 3 may be displayed on the display device 22. The decision path may then branch to a transition portion of the third "Sparkle Stars Reward" video component at 442 that adds sparkles around the number 3 displayed on the display device 22. From 442 the decision path may branch to 444 and a transition portion of the "Counting the Balls" video component, followed by the "Congratulations" video component at 446 and the fourth "Sparkle Stars Reward" video component at 448, thereby concluding the decision path.

In this manner, the interactive video presentation may play without pausing to wait for user inputs at decision points, and may play in full even if the user takes no action at each decision point. This is in contrast to conventional video games that incorporate video components, which may wait at a decision point to receive input before continuing play.

With reference now to FIG. 11, a more detailed description of a layered interactive video segment is provided. More specifically, FIG. 11 provides an example embodiment of a method 500 of providing an interactive video viewing experience through one or more layered interactive video segments. The method 500 may be performed using the hardware and software components of the computing system 14 or any other suitable components. For convenience of description, a simplified schematic illustration of selected components of computing system 14 is illustrated in FIG. 12. The method 500 will be described herein with reference to the components of computing system 14 shown in FIG. 12.

With reference now to FIG. 11, at 502 the method 500 may comprise receiving a first digital video layer and a second digital video layer, with the second digital video layer being complimentary to and synchronized with the first digital video layer. As illustrated in FIG. 12, the computing device 26 may receive multiple digitally encoded files or data structures containing multiple layers of video. In other examples, the computing device 26 may receive multiple layers of digitally encoded video as a single encoded file or data structure. In these examples, the computing device 26 may parse the file or data structure into multiple layers of digitally encoded video. The computing device 26 then decodes the multiple layers of digitally encoded video and blends two or more layers as described in more detail below.

As noted above with reference to FIG. 1, the digitally encoded video may be received from DVD 30, broadcast television provider 42, server 34, or any other suitable content source. In some examples, the digitally encoded video may comprise produced, pre-recorded linear video. In other examples, the digitally encoded video may comprise one or more streams of live, broadcast television. The digitally encoded video may also be received in any suitable video compression format, including, but not limited to, WINDOWS MEDIA Video format (.wmv), H.264/MPEG-4 AVC (Advanced Video Coding), or other suitable format or standard.

As shown in FIG. 12, in one example the computing device 26 may receive a first digital video layer 522, a second digital video layer 526, a third digital video layer 530, and a fourth digital video layer 534. It will be appreciated that more or less digital video layers may also be received by the computing device 26. In one example, the second digital video layer 526 may be complimentary to the first digital video layer 522. For purposes of the present disclosure, and as described in more detail below, a second digital video layer may be complimentary to a first digital video layer when the second layer changes, enhances, or otherwise alters the user's perception of the first layer. Additionally and as described in more detail below, metadata 538 received by the computing device 26 may describe, implement, or otherwise relate to one or more complimentary aspects of the second digital video layer with respect to the first digital video layer. Metadata 538 may be synchronized with the first digital video layer 522 and the second digital video layer 526, and may be used to specify a manner of rendering a composite frame of image data based on an actual user input specified by the metadata. Metadata 538 may be received from the server 34, broadcast television provider 42, DVD 30, or other suitable content source. Additionally, metadata 538 may be contained in an XML data file or any other suitable data file.

In one example, the second digital video layer 526 may be complimentary to the first digital video layer 522 by virtue of an element in the second digital video layer that comprises a visual effect applied to an element in the first digital video layer. In a more specific example, the first digital video layer 522 may comprise a scene depicting a cow jumping over the moon in a night sky. The moon may be shown as it commonly appears with various craters and shadows, for example. The second digital video layer 526 may comprise a modified moon that appears identical to the moon in the first digital video layer 522, except that the modified moon includes two eyes that are synchronized to follow the cow's movement over the moon from one side to the other.

At 504 the method comprises sending the first digital video layer 522 of the scene depicting a cow jumping over the moon to the display device 22. At 506, the method comprises receiving metadata 538 that comprises blending information for blending the second digital video layer 526 (in this example, the modified moon) with the first digital video layer 522 (in this example, the moon without the two eyes) based upon a possible user input. At 508, the method comprises receiving an actual user input. In one example, the actual user input may comprise the user pointing at the moon that is shown in the first digital video layer 522. The computing device 26 may receive this actual user input in the form of data from the depth sensor 58 that corresponds to the user's movements.

Based upon the actual user input, and where the actual user input (in this example, pointing at the moon) matches the possible user input (in this example, pointing at the moon), at 510 the method 500 renders a composite frame of image data in a manner specified by the metadata 538. The composite frame of image data may comprise data from a frame of the second digital video layer 526 that is blended with data from a frame of the first digital video layer 522. At 512, the method 500 sends the composite frame of image data to the display device 22.

In the present example, the composite frame of image data blends the modified moon containing the two eyes with the moon shown in the first digital video layer 522. As experienced by the user 18, when the user points at the moon two eyes appear on the moon and follow the cow's movement over the moon. Additionally, because the second digital video layer 526 is synchronized with the first digital video layer 522, when the eyes are revealed upon the user pointing at the moon, the eyes are looking at the cow and continue to follow the cow over the moon.

It will be appreciated that many other and various visual effects may be provided by one or more elements in a digital video layer. Other visual effects include, but are not limited to, zooming into a portion of a scene, creating a "lens" that may move around the scene to magnify different areas of the scene, launching another digital video layer, revealing another digital video layer that is running in parallel, etc. As described above, one or more visual effects may also be triggered and/or controlled by actual user input from the user 18.

In other examples, the second digital video layer 526 may comprise one or more links to additional content. In a more specific example, the second digital video layer 526 may include a link that the user 18 may select by performing a gesture or motion related to the link. The user 18 may point at the link to select it, may manipulate an element on the display device 22 to select it, etc. Once selected, the link may expose hidden layers of content on the display device, such as clues for a game, more detailed information regarding an educational topic, or other suitable content.

In some examples, rendering the composite frame of image data may occur at a location remote from the computing device 26, such as at server 34. The composite frame of image data may be received by the computing device 26 from the server 34, and then sent to the display device 22. In other examples, rendering the composite frame of image data may occur on the computing device 26 at runtime.

In another example, the metadata 538 may comprise blending information that instructs the computing device 26 to select a second digital video layer based upon a timing of a user action. In the present example, if the user points at the moon within a predetermined time period, such as while the cow is jumping over the moon, then the computing device 26 may proceed to blend the second digital video layer 526 with the first digital video layer 522 as described above. If the user does not point at the moon within the predetermined time period, then the computing device may continue sending the first digital video layer 522 to the display device 22. In other examples, the metadata 538 may comprise blending information that instructs the computing device 26 to select a second digital video layer based upon one or more variations of the user action.

In other examples, the third digital video layer 530 and/or fourth digital video layer 534 may be complimentary to the first digital video layer 522. In these examples, the metadata 518 may comprise blending information for blending the third digital video layer 530 and/or fourth digital video layer 534 with the first digital video layer 522 based upon actual input from the user. In this manner, the composite frame of image data may comprise data from a frame of the third digital video layer 530 and/or fourth digital video layer 534 that is blended with data from a frame of the first digital video layer 522.

Figure 13:
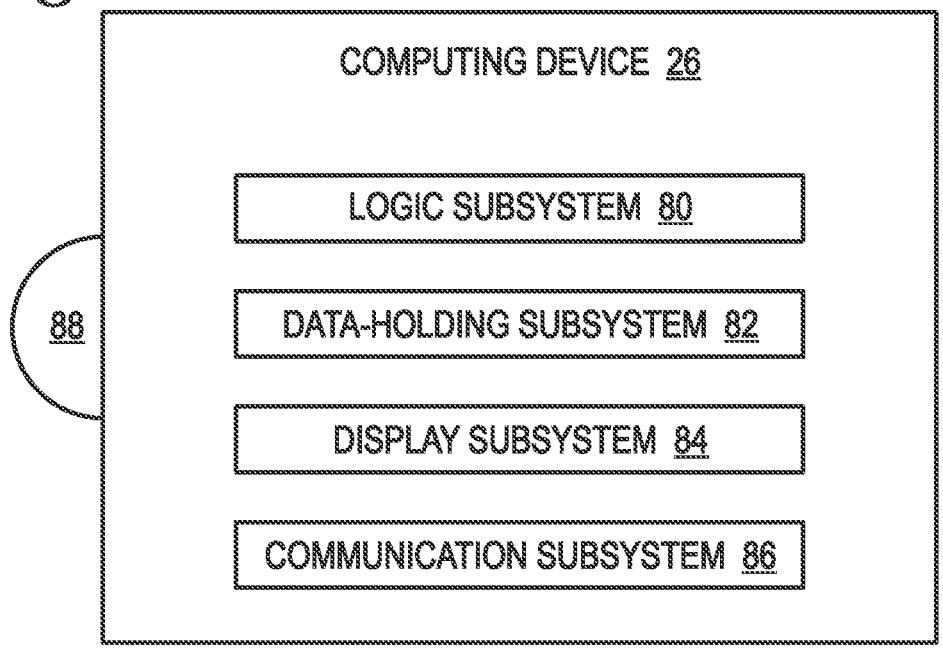
FIG. 13 shows a simplified schematic illustration of an embodiment of a computing device.

FIG. 13 schematically illustrates a nonlimiting embodiment of a computing device, such as computing device 26, that may perform one or more of the above described methods and processes. Computing device 26 is shown in simplified form. It is to be understood that virtually any computer architecture may be used without departing from the scope of this disclosure. In different embodiments, computing device 26 may take the form of a set-top box (e.g. cable television box, satellite television box), digital video recorder (DVR), desktop computer, laptop computer, tablet computer, home entertainment computer, network computing device, etc. Further, in some embodiments the methods and processes described herein may be implemented as a computer application, computer service, computer API, computer library, and/or other computer program product in a computing system that includes one or more computers.

As shown in FIG. 13, computing device 26 includes a logic subsystem 80, a data-holding subsystem 82, a display subsystem 84, and a communication subsystem 86. As described above and shown in FIG. 1, the computing device 26 may also be communicatively connected to one or more user input devices 54 such as, for example, the depth sensor 58. Computing device 26 may also optionally include a sensor subsystem and/or other subsystems and components not shown in FIG. 13.

Logic subsystem 80 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 80 may include one or more processors that are configured to execute software instructions. Additionally or alternatively, the logic subsystem 80 may include one or more hardware or firmware logic machines configured to execute hardware or firmware instructions. Processors of the logic subsystem 80 may be single core or multicore, and the programs executed thereon may be configured for parallel or distributed processing.

Data-holding subsystem 82 may include one or more physical, non-transitory devices configured to hold data and/or instructions executable by the logic subsystem to implement the methods and processes described herein. When such methods and processes are implemented, the state of data-holding subsystem 82 may be transformed (e.g., to hold different data). As noted above with reference to FIG. 1, data-holding subsystem may include one or more interactive video programs 32.

Data-holding subsystem 82 may include removable media and/or built-in devices. Data-holding subsystem 82 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 82 may include devices with one or more of the following characteristics: volatile, nonvolatile, dynamic, static, read/write, read-only, random access, sequential access, location addressable, file addressable, and content addressable. In some embodiments, logic subsystem 80 and data-holding subsystem 82 may be integrated into one or more common devices, such as an application specific integrated circuit or a system on a chip.

FIG. 13 also shows an aspect of the data-holding subsystem 82 in the form of removable computer-readable storage media 88, which may be used to store and/or transfer data and/or instructions executable to implement the methods and processes described herein. Removable computer-readable storage media 88 may take the form of the DVD 30 illustrated in FIG. 1, CDs, HD-DVDs, Blu-Ray Discs, EEPROMs, and/or floppy disks, among others.

It is to be appreciated that data-holding subsystem 82 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

As described above, display subsystem 84 includes one or more image display systems, such as display device 22, configured to present a visual representation of data held by data-holding subsystem 82. As the methods and processes described herein change the data held by the data-holding subsystem 82, and thus transform the state of the data-holding subsystem, the state of display subsystem 84 may likewise be transformed to visually represent changes in the underlying data.

Communication subsystem 86 may be configured to communicatively couple computing device 26 with network 50 and/or one or more other computing devices. Communication subsystem 86 may include wired and/or wireless communication devices compatible with one or more different communication protocols. As nonlimiting examples, communication subsystem 86 may be configured for communication via a wireless telephone network, a wireless local area network, a wired local area network, a wireless wide area network, a wired wide area network, etc. In some embodiments, communication subsystem 86 may allow computing device 26 to send and/or receive messages to and/or from other devices via a network such as the Internet.

The terms "module" and "program" may be used to describe an aspect of the computing system 14 that is implemented to perform one or more particular functions. In some cases, such a module and/or program may be instantiated via logic subsystem 80 executing instructions held by data-holding subsystem 82. It is to be understood that different modules and/or programs may be instantiated from the same application, service, code block, object, library, routine, API, function, etc. Likewise, the same module or program may be instantiated by different applications, services, code blocks, objects, routines, APIs, functions, etc. The terms "module" and "program" are meant to encompass individual or groups of executable files, data files, libraries, drivers, scripts, database records, etc.

It is to be understood that the configurations and/or approaches described herein are presented for the purpose of example, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device, a method of creating an interactive video program that includes multiple viewing routes, the interactive video program providing a linear video viewing experience through each of the multiple viewing routes, the method comprising:
    combining a first pre-recorded interactive video segment of a first type and a second pre-recorded interactive video segment of a second, different type than the first pre-recorded interactive video segment to form the interactive video program,
    the first pre-recorded interactive video segment comprising a first video component, a second video component, and metadata that includes information related to a possible user input during the first video component and that also includes information identifying the first pre-recorded interactive video segment as being of the first type,
    the second pre-recorded interactive video segment comprising a third video component and also comprising metadata identifying the second pre-recorded interactive video segment as being of the second type, and
    the interactive video program further comprising
        an active viewing route that proceeds through the first pre-recorded interactive video segment and the second pre-recorded interactive video segment, and includes playback of the second video component, the active viewing route configured to be triggered by receipt of a user input that corresponds to the possible user input, and
        a passive viewing route that proceeds through the first pre-recorded interactive video segment and the second pre-recorded interactive video segment without playback of the second video component, the passive viewing route configured to be followed where no user input corresponding to the possible user input is received, and
    adjusting a duration of the first video component based on one or more of an amount and frequency of the user's interaction with the first video component.

2. The method of claim 1, further comprising receiving the first pre-recorded interactive video segment and the second pre-recorded interactive video segment from a source remotely located from the computing device.

3. The method of claim 1, wherein the first pre-recorded interactive video segment comprises one of a layered interactive video segment, a branching interactive video segment, an augmented reality interactive video segment, a shell and narrative interactive video segment, and a socially interactive video segment.

4. The method of claim 3, wherein the second pre-recorded interactive video segment comprises a different one of a layered interactive video segment, a branching interactive video segment, an augmented reality interactive video segment, a shell and narrative interactive video segment, and a socially interactive video segment than the first interactive video segment.

5. The method of claim 4, wherein the active viewing route and the passive viewing route are each configured to proceed without waiting for a user input at a decision point.

6. The method of claim 1, further comprising modifying a temporal order of the first pre-recorded interactive video segment and the second pre-recorded interactive video segment within the interactive video program based on previous activity of the user.

7. The method of claim 1, wherein the possible user input comprises a gesture.

8. The method of claim 1, wherein the possible user input comprises audio.

9. The method of claim 1, wherein the possible user input comprises touch-based input.

10. The method of claim 1, wherein the possible user input comprises input from a game controller.

11. In a computing device, a method of providing an interactive video program that provides a linear video viewing experience through each viewing route of multiple viewing routes through the interactive video program, the method comprising:

obtaining a first pre-recorded interactive video segment of a first type, the first pre-recorded interactive video segment comprising a first video component, and metadata that includes information related to a possible user input during the first video component and that also includes information identifying that the first pre-recorded interactive video segment is of the first type;

obtaining a second pre-recorded interactive video segment of a second, different type than the first pre-recorded interactive video segment, the second pre-recorded interactive video segment comprising a third video component and also comprising metadata identifying that the second pre-recorded interactive video segment is of the second type;

sending a representation of the first video component to a display device;

if a user input is received that corresponds to the possible user input, then sending a representation of the second video component and the third video component to the display device;

if no user input is received that corresponds to the possible user input, then sending a representation of the third video component to the display device and not sending a representation of the second video component to the display device; and adjusting a duration of the first video component based on one or more of an amount and frequency of the user's interaction with the first video component.

12. The method of claim 11, further comprising receiving the first pre-recorded interactive video segment and the second pre-recorded interactive video segment from a source remotely located from the computing device.

13. The method of claim 11, further comprising receiving the first pre-recorded interactive video segment and the second pre-recorded interactive video segment from a data holding subsystem of the computing device.

14. The method of claim 11, wherein the first pre-recorded interactive video segment comprises one of a layered interactive video segment, a branching interactive video segment, an augmented reality interactive video segment, a shell and narrative interactive video segment, and a socially interactive video segment.

15. The method of claim 14, wherein the second pre-recorded interactive video segment comprises a different one of a layered interactive video segment, a branching interactive video segment, an augmented reality interactive video segment, a shell and narrative interactive video segment, and a socially interactive video segment than the first interactive video segment.

16. The method of claim 15, further comprising obtaining a third pre-recorded interactive video segment of a different type than the first interactive video segment and the second interactive video segment.

17. The method of claim 11, further comprising modifying a temporal order of the first pre-recorded interactive video segment and the second pre-recorded interactive video segment within the interactive video program based on previous activity of the user.

18. The method of claim 11, further comprising capturing an image of a user and incorporating the image into one or more of the first video component and the second video component.

19. The method of claim 11, wherein the possible user input comprises one or more of a gesture, audio, touch-based input, or input from a game controller.

20. A computing device, comprising:

a logic subsystem; and a data-holding subsystem comprising instructions stored thereon that are executable by the logic subsystem to present an interactive video program that includes multiple viewing routes, each of the viewing routes providing a linear video viewing experience, by:

obtaining a first pre-recorded interactive video segment comprising a first video component and first metadata that includes information related to a first possible user input during the first video component, the first metadata also identifying that the first pre-recorded interactive video segment comprises branching interactive video;

detecting via the first metadata that the first pre-recorded interactive video segment comprises branching interactive video;

sending a representation of the first video component to a display device;

receiving a first user input;

if the first user input corresponds to the first possible user input, branching to the second video component and sending a representation of the second video component to the display device;

obtaining a second pre-recorded interactive video segment comprising a third video component and second metadata that includes information related to a second possible user input during the third video component configured to trigger a layered presentation of a fourth video component along with the third video component, the second metadata also identifying that the second pre-recorded interactive video segment comprises layered interactive video;

detecting via the second metadata that the second pre-recorded interactive video segment comprises layered interactive video;

sending a representation of the third video component to the display device;

receiving a second user input;

if the second user input corresponds to the second possible user input, sending a representation of the fourth video component to the display device; and adjusting a duration of the first video component based on one or more of an amount and frequency of the user's interaction with the first video component.

21. The computing device of claim 20, further comprising obtaining an augmented reality interactive video segment and presenting the augmented reality interactive video segment either before or after presenting one or more of a branching interactive video segment and a layered interactive video segment.

22. The computing device of claim 20, further comprising receiving the first pre-recorded interactive video segment and the second pre-recorded interactive video segment from a source remotely located from the computing device.

23. The computing device of claim 20, further comprising receiving the first pre-recorded interactive video segment and the second pre-recorded interactive video segment from removable media.

24. The computing device of claim 20, wherein the first possible user input and the second possible user input each comprise one or more of a gesture, audio, touch-based input, or input from a game controller.

\* \* \* \* \*